(12) United States Patent
Ohtake et al.

(10) Patent No.: US 8,922,907 B2
(45) Date of Patent: Dec. 30, 2014

(54) VARIABLE FOCAL LENGTH LENS SYSTEM AND IMAGING APPARATUS

(75) Inventors: Motoyuki Ohtake, Saitama (JP); Hideki Kai, Kanagawa (JP); Hiroyuki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 119 days.

(21) Appl. No.: 13/571,594

(22) Filed: Aug. 10, 2012

(65) Prior Publication Data

US 2013/0057751 A1  Mar. 7, 2013

(30) Foreign Application Priority Data

Sep. 2, 2011 (JP) .................. 2011-191470

(51) Int. Cl.
*G02B 15/14* (2006.01)
*G02B 15/173* (2006.01)
*G02B 15/20* (2006.01)

(52) U.S. Cl.
CPC .............. *G02B 15/173* (2013.01); *G02B 15/14* (2013.01); *G02B 15/20* (2013.01)
USPC ............................ 359/687; 359/676; 359/686

(58) Field of Classification Search
USPC ................... 359/676, 686–687, 554–557, 715
See application file for complete search history.

(56) References Cited

U.S. PATENT DOCUMENTS 5,557,470 A * 9/1996 Shibayama .................... 359/687
5,859,729 A * 1/1999 Misaka ......................... 359/686
6,084,722 A * 7/2000 Horiuchi ....................... 359/687
6,606,194 B2 * 8/2003 Hamano et al. ............... 359/557
7,136,231 B2 * 11/2006 Ito et al. ........................ 359/687
7,161,742 B2 * 1/2007 Yamada ........................ 359/687
7,227,699 B2 * 6/2007 Hamano et al. ............... 359/687

FOREIGN PATENT DOCUMENTS

| JP | 2002-323656 A | 11/2002 |
|---|---|---|
| JP | 2003-241092 A | 8/2003 |
| JP | 2007-114432 A | 5/2007 |
| JP | 2009-156891 A | 7/2009 |
| JP | 2010-237453 A | 10/2010 |

* cited by examiner

*Primary Examiner* — Thong Nguyen

(74) *Attorney, Agent, or Firm* — Rader, Fishman & Grauer PLLC

(57) ABSTRACT

A variable focal length lens system including: a first lens group having positive power; a second lens group having negative power; a third lens group having positive power; and a fourth lens group having positive power sequentially arranged from a side where an object is present. An aperture stop is disposed between the second and third lens groups. The first to fourth lens groups are so moved that the distance between the first and second lens groups increases, the distance between the second and third lens groups decreases, and the distance between the third and fourth lens groups decreases when a lens position setting is changed from a wide angle end state to a telescopic end state. The third lens group includes a negative lens and a positive lens disposed on the image side thereof. The variable focal length lens system satisfies the conditional expression, $0.35<f3/|f3a|<0.8$.

12 Claims, 16 Drawing Sheets

EXAMPLE 1

EXAMPLE 1

EXAMPLE 2

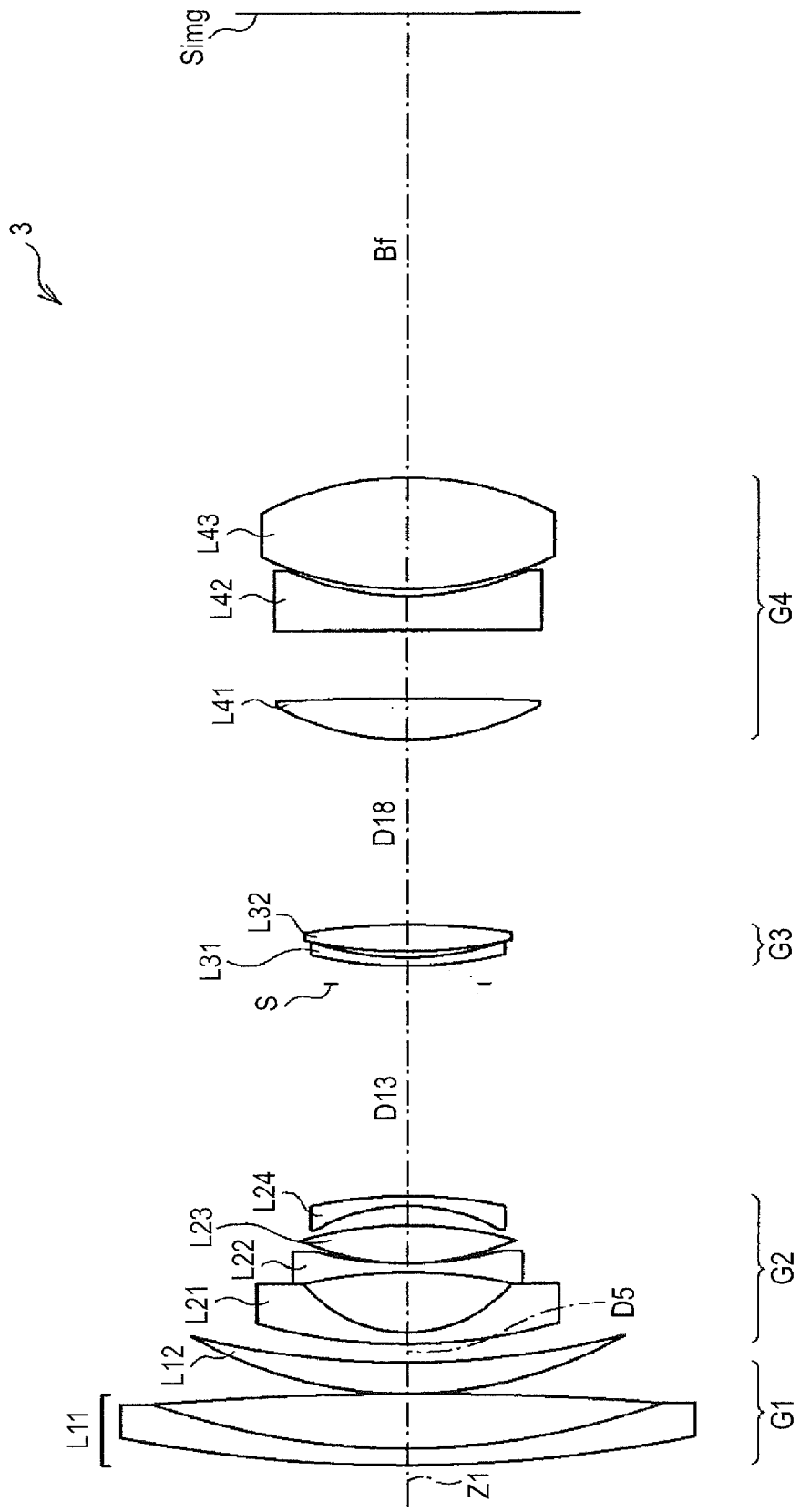

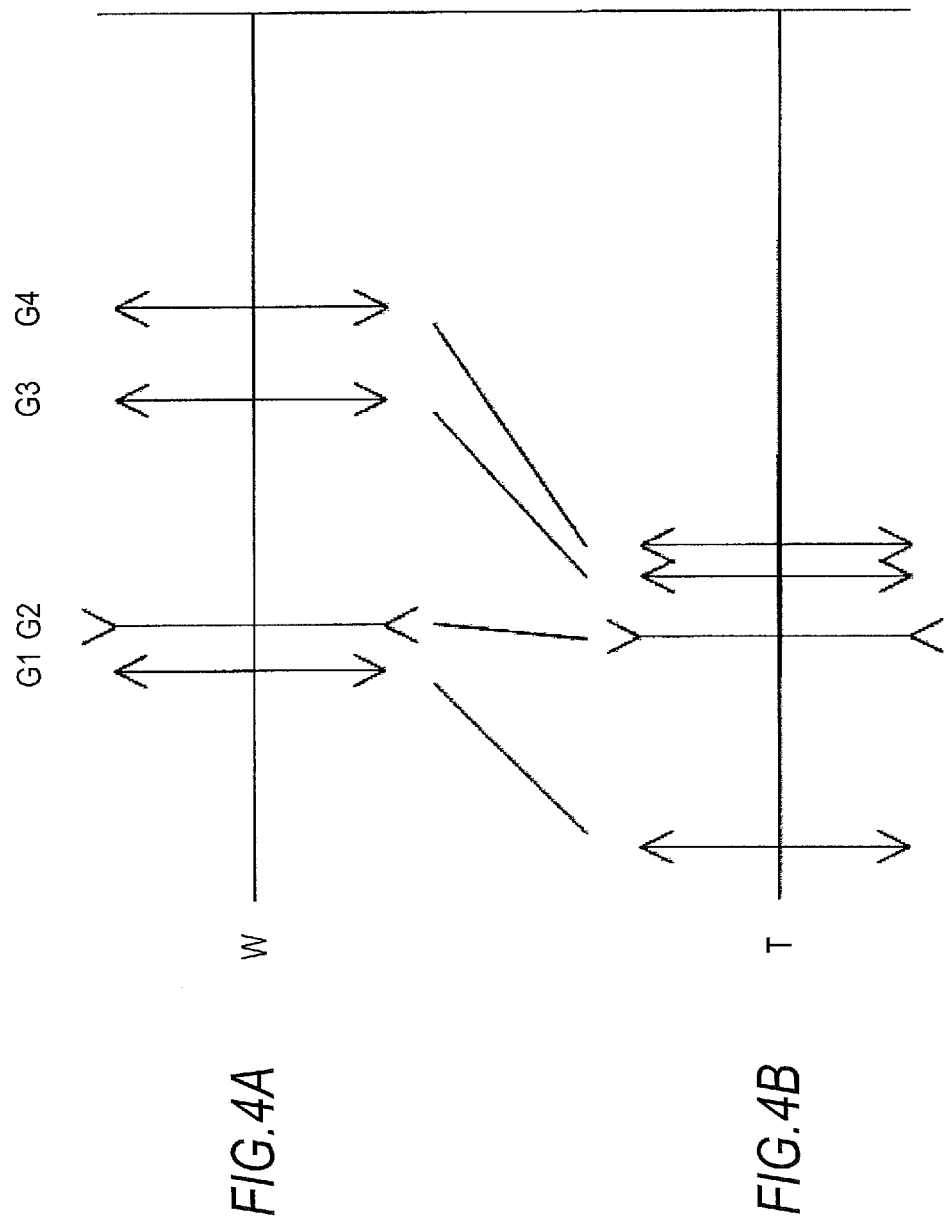

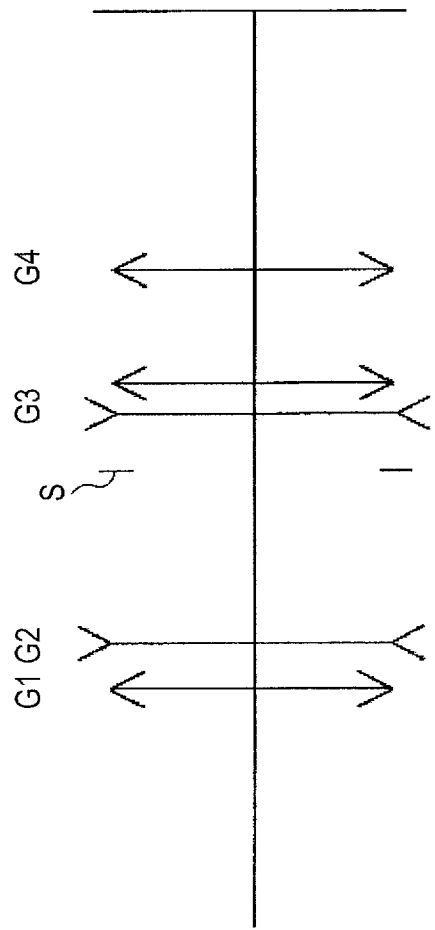
FIG.5A
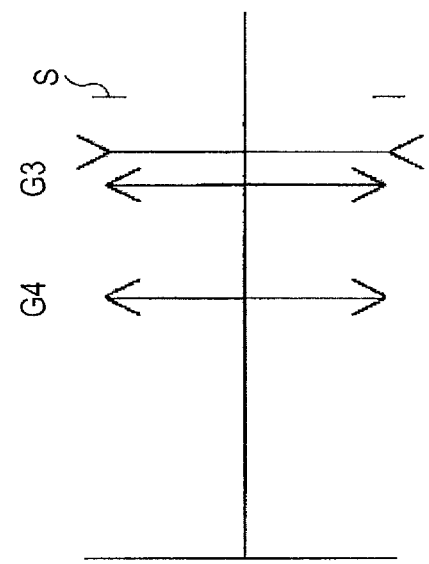
FIG.5B REVERSED STATE

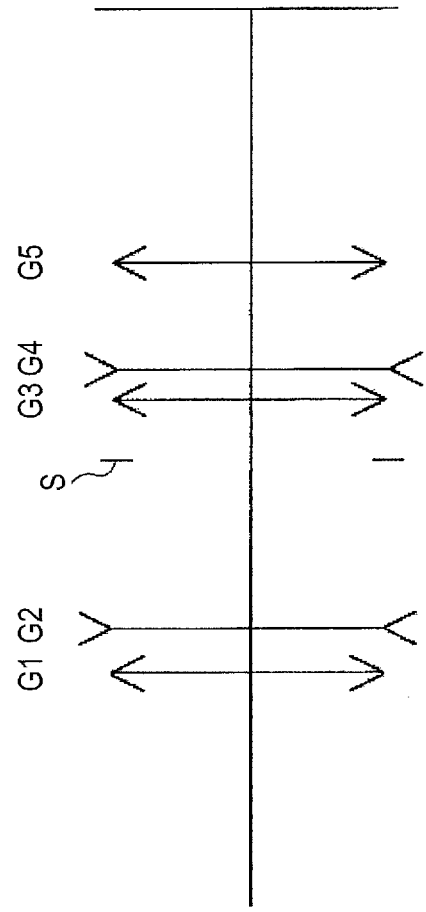
FIG.6A
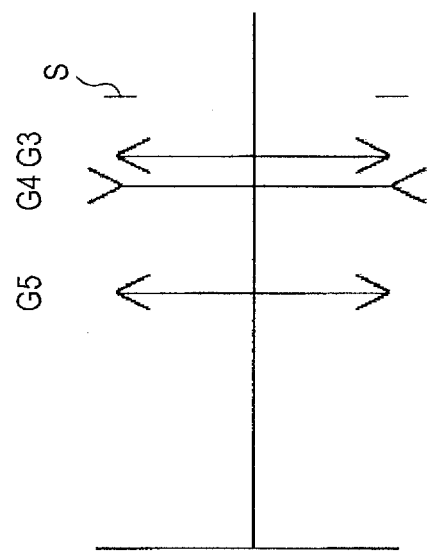
FIG.6B  REVERSED STATE

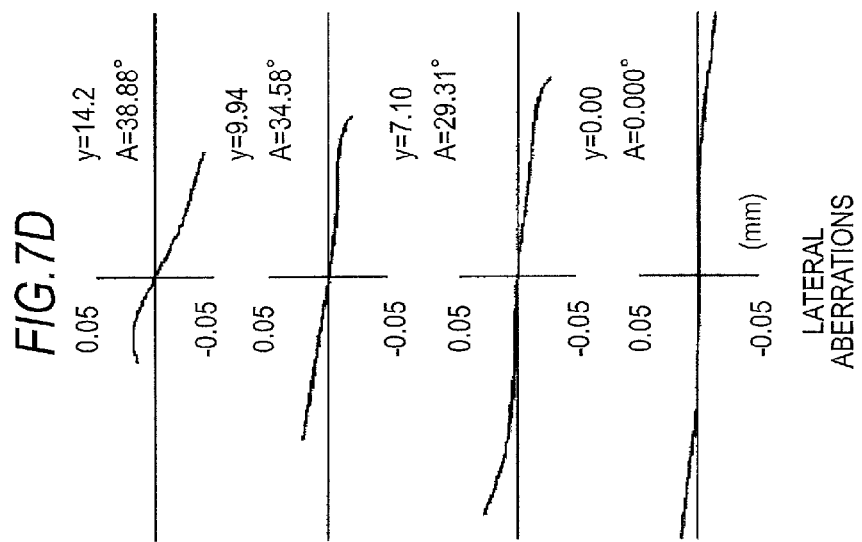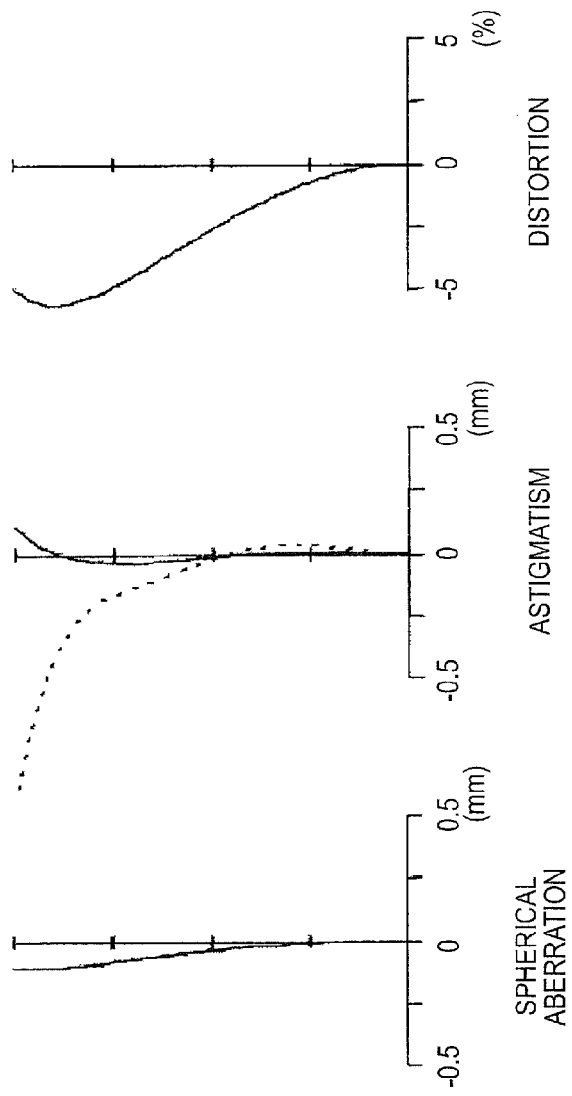

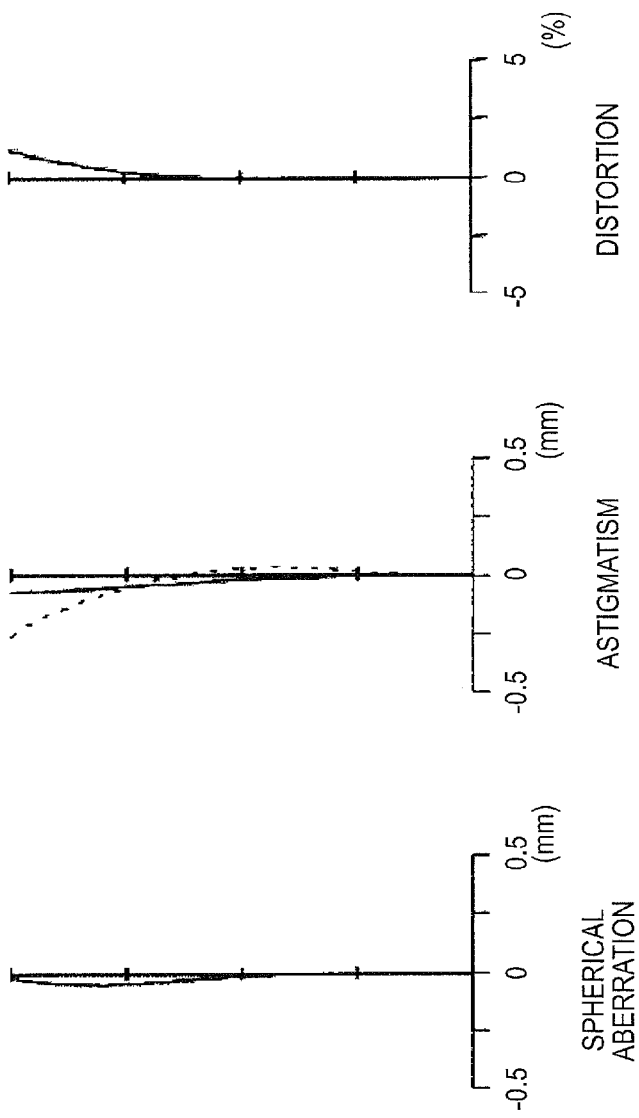

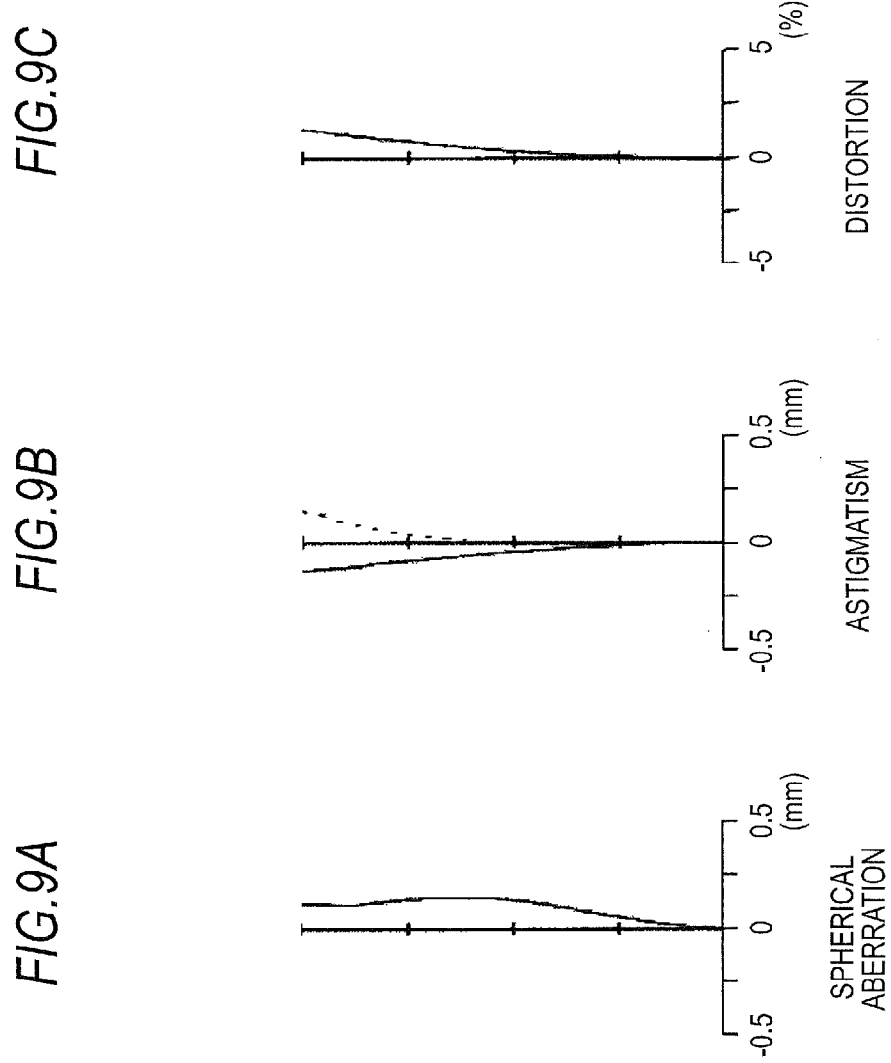

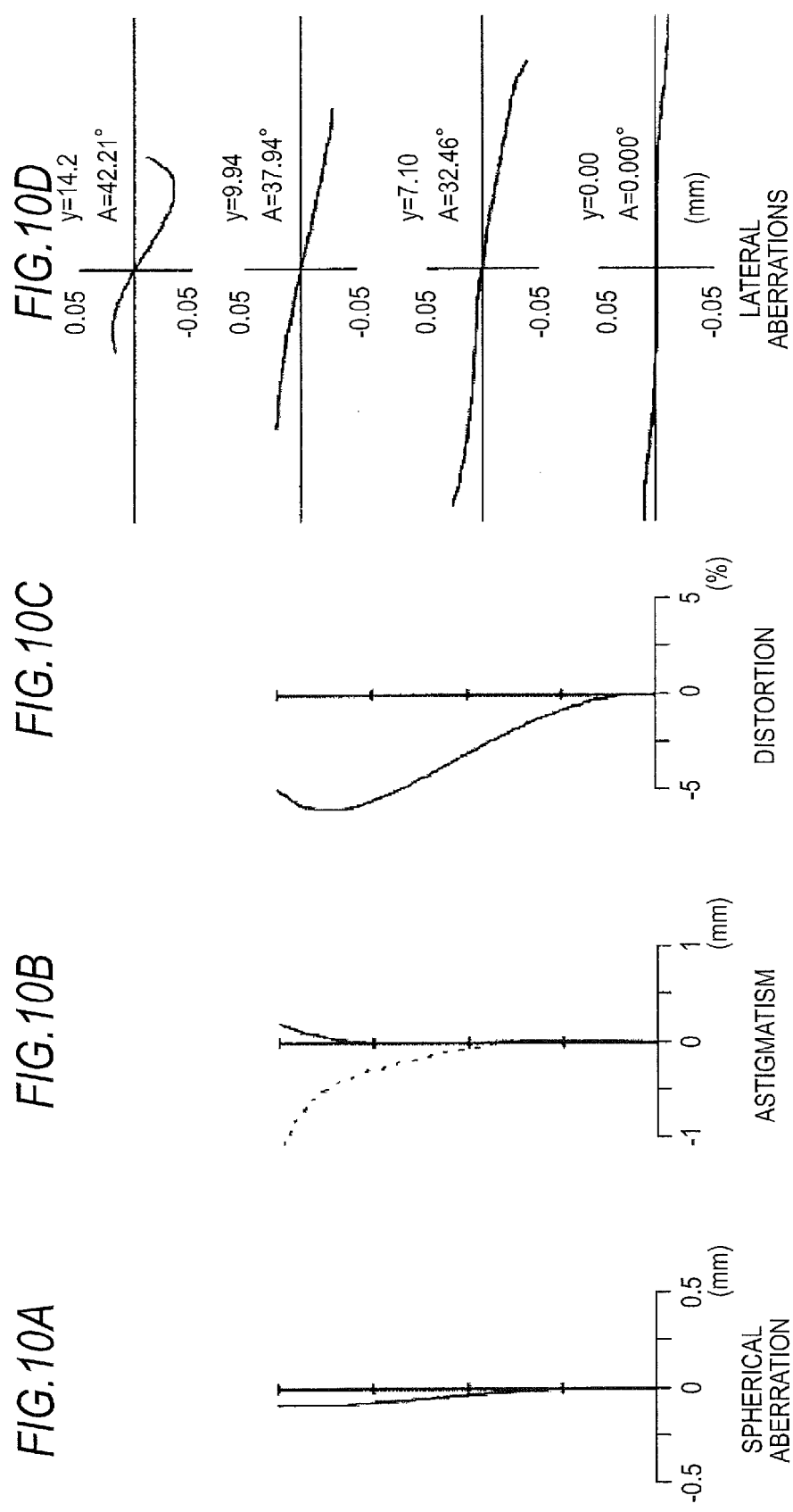

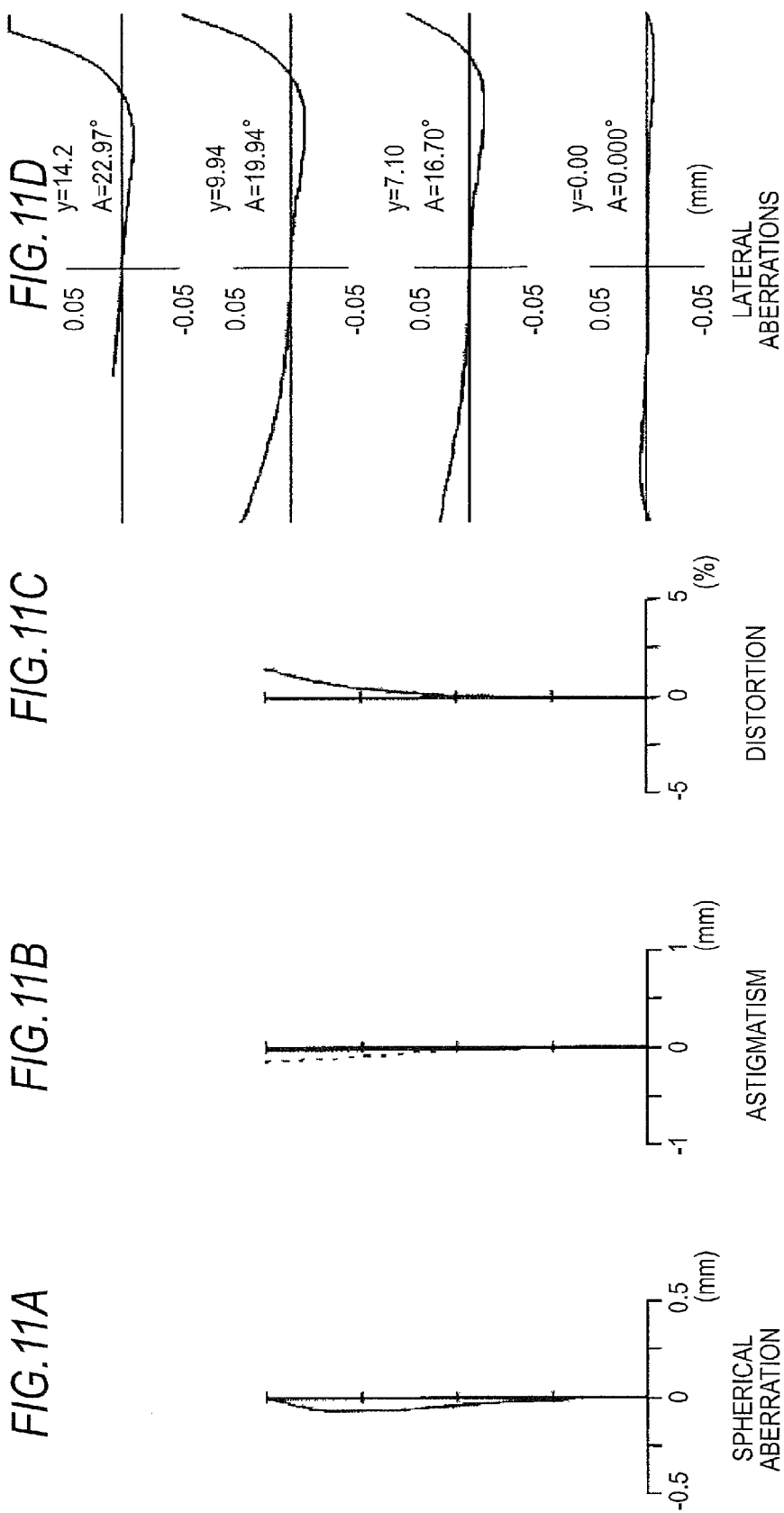

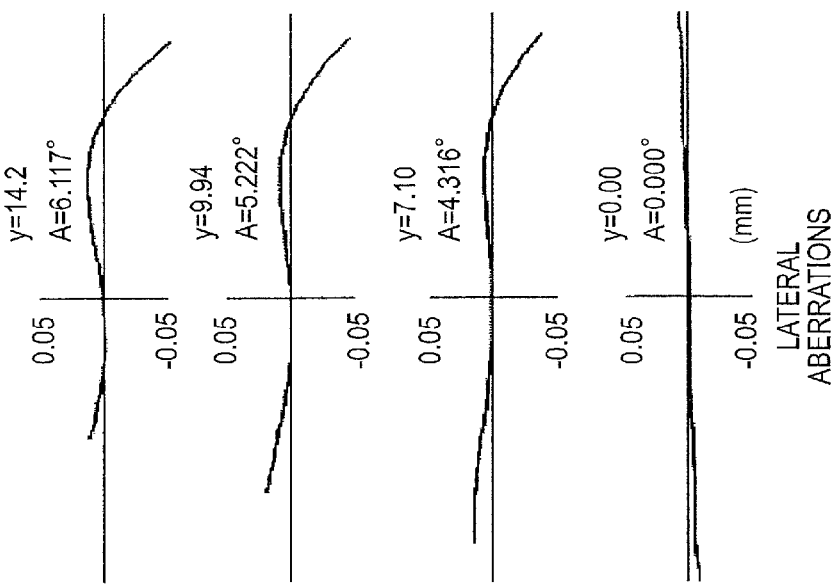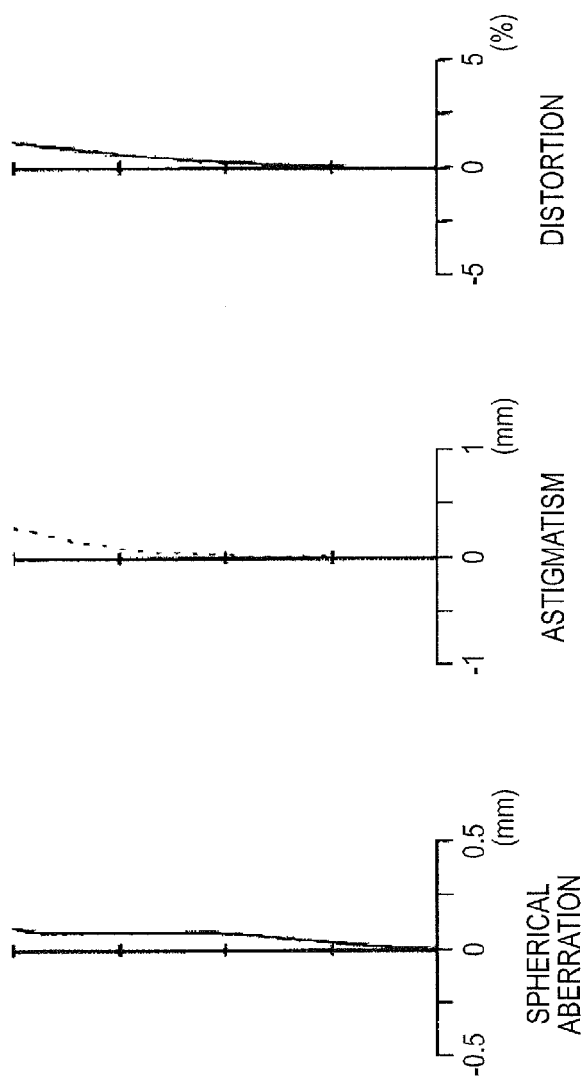

EXAMPLE 3/WIDE ANGLE END
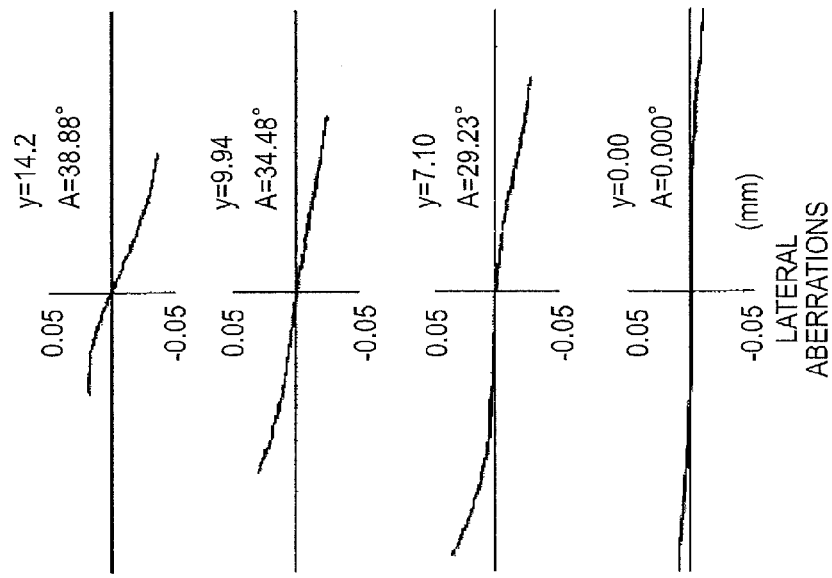
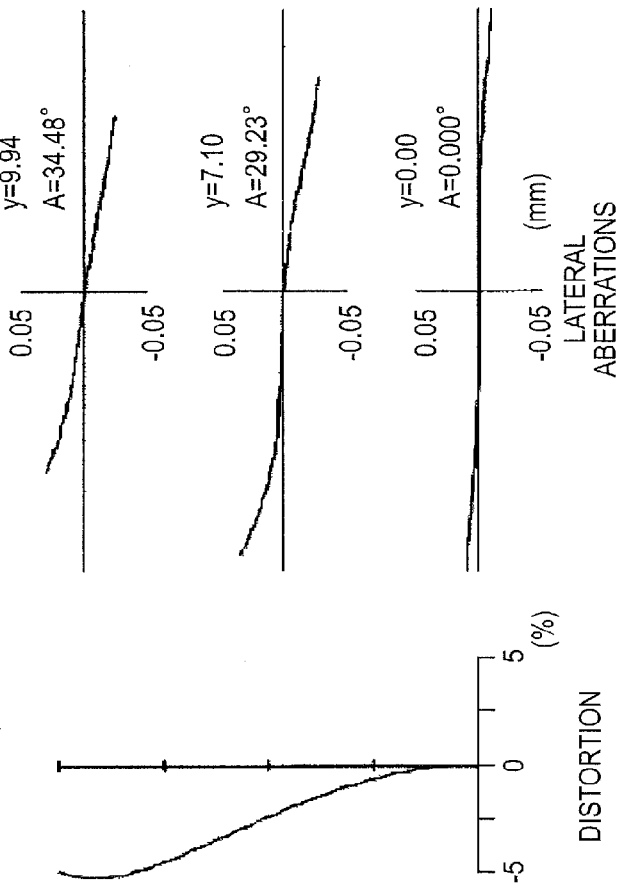
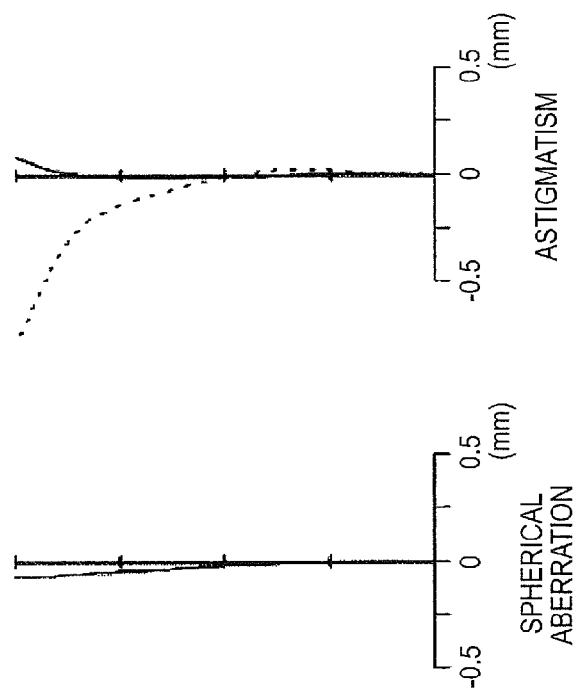

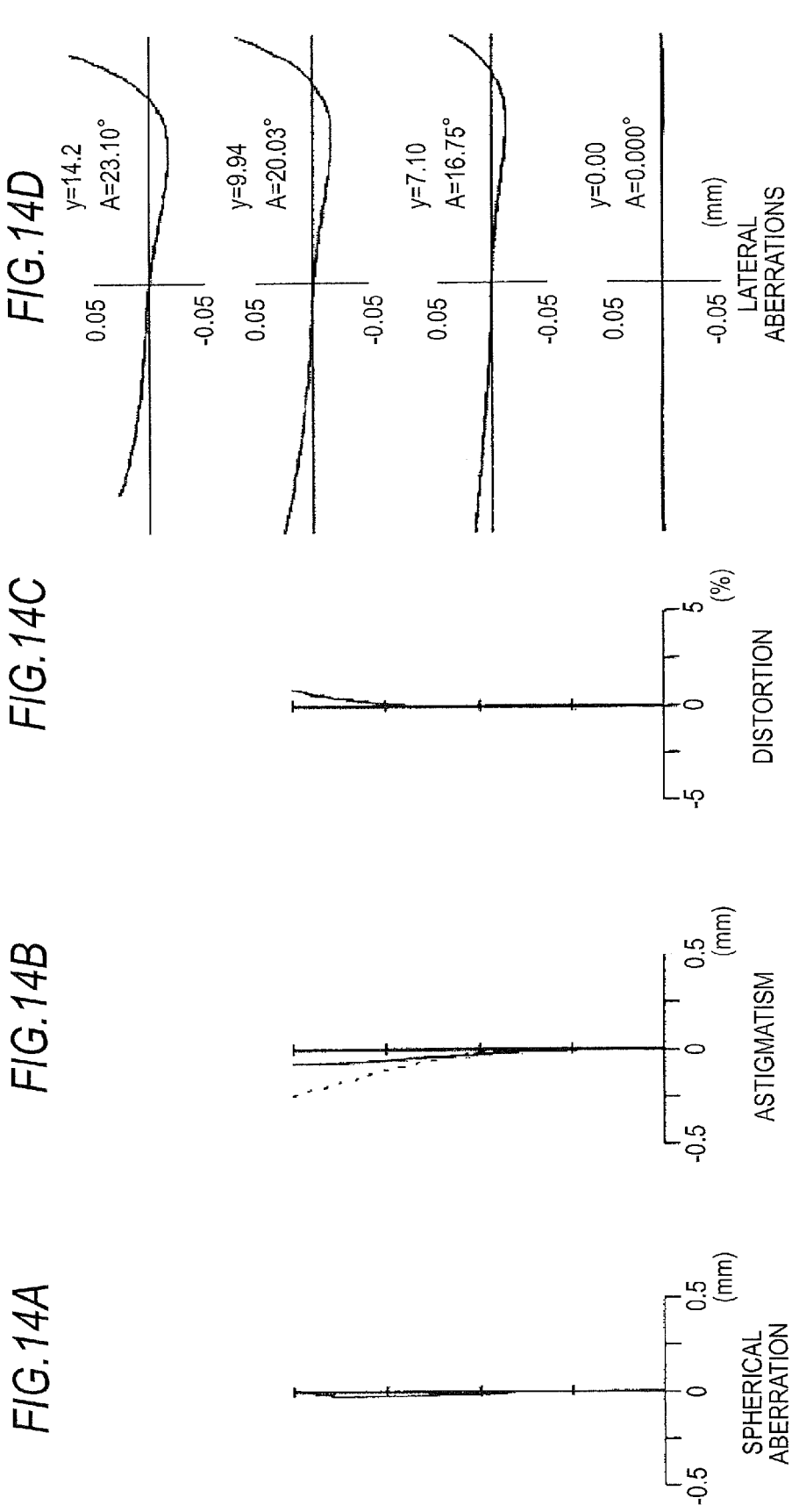

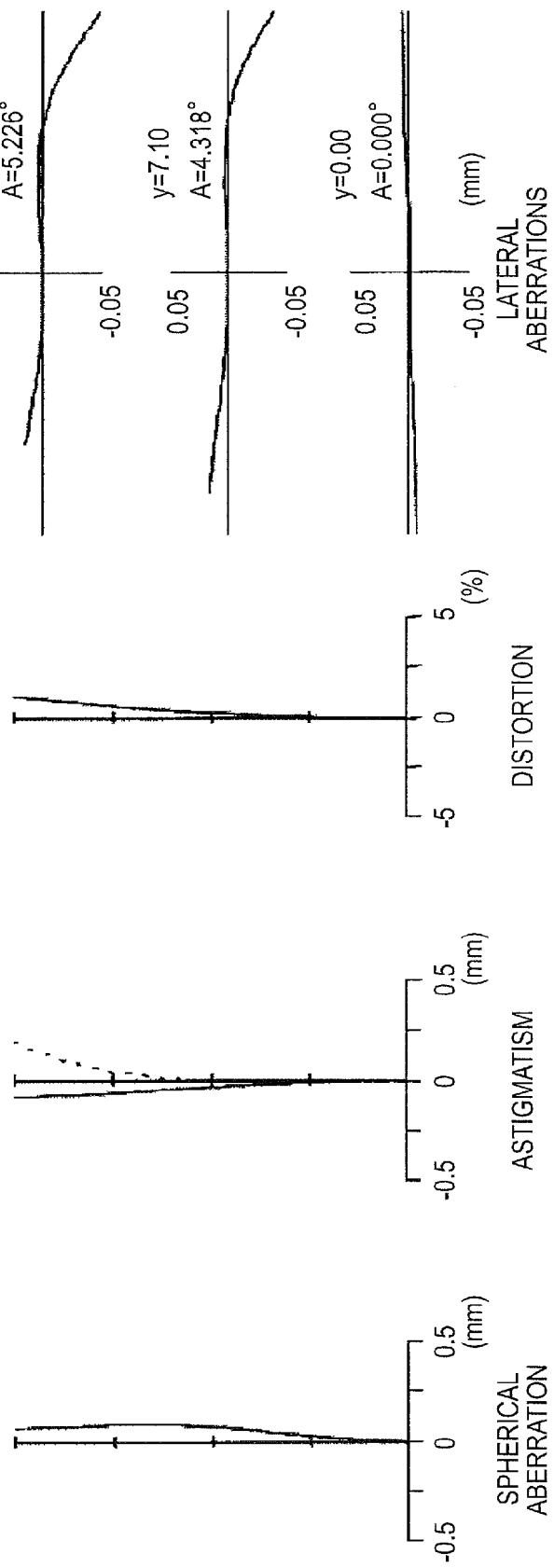

VARIABLE FOCAL LENGTH LENS SYSTEM AND IMAGING APPARATUS

FIELD

The present disclosure relates to an objective lens suitable for a digital camera and a video camcorder, and particularly to a variable focal length lens system suitable for a zoom lens having an angle of view ranging from about 24 to 35 mm on a 35-mm format basis in a wide angle end state and having a zoom ratio ranging from about 6 to 9 and to an imaging apparatus into which the variable focal length lens system is incorporated.

BACKGROUND

As recording means used with a camera, there is a known method including forming a subject image on an imaging device formed of photoelectric conversion devices, such as CCD (charge coupled device) and CMOS (complementary metal oxide semiconductor) elements, converting the amount of light of the subject image into an electric output in the photoelectric conversion device, and recording the electric output.

On the other hand, recent advances in micro-processing technologies have allowed a central processing unit (CPU) to operate faster and a storage medium to have higher packing density than ever, whereby a large amount of image data that has not been handled before can now be processed at high speed. Photoelectric conversion devices have also been packed more densely and reduced in size. The higher packing density allows higher spatial frequency recording, and the size reduction allows reduction in entire camera size.

The higher packing density and size reduction described above, however, disadvantageously narrow the light receiving area of each photoelectric conversion device and increase its susceptibility to noise as its electric output level decreases. To address the problems, the amount of light that reaches each photoelectric conversion device is increased by increasing the aperture diameter of an optical system, and tiny lens elements (what is called a microlens array) are disposed immediately in front of the photoelectric conversion devices. The microlens array advantageously guides a light flux directed to the space between adjacent photoelectric conversion devices to these photoelectric conversion devices but disadvantageously constrains the exit pupil position of a lens system. The reason for this is that when the exit pupil position of the lens system approaches the photoelectric conversion devices, that is, when the principal ray that reaches each of the photoelectric conversion devices forms a large angle with the optical axis of the lens system, off-axis light fluxes directed toward the periphery of the screen are inclined to the optical axis by large angles and hence do not reach photoelectric conversion devices, resulting in an insufficient amount of light.

In general, what is called a standard zoom lens has an angle of view ranging from about 24 to 35 mm on a 35-mm format basis in an wide angle end state in which the focal length of the zoom lens is minimized and an angle of view greater than 50 mm on a 35-mm format basis in a telescopic end state in which the focal length is maximized.

The standard zoom lens has employed a positive, negative, positive, and positive four-group configuration and a positive, negative, positive, negative, and positive five-group configuration in many cases. A positive, negative, positive, and positive four-group zoom lens includes a first lens group having positive power, a second lens group having negative power, a third lens group having positive power, and a fourth lens group having positive power sequentially arranged from the object side. A positive, negative, positive, negative, and positive five-group zoom lens includes a first lens group having positive power, a second lens group having negative power, a third lens group having positive power, a fourth lens group having negative power, and a fifth lens group having positive power sequentially arranged from the object side.

JP-A-2002-323656, JP-A-2003-241092, and JP-A-2007-114432, for example, describe positive, negative, positive, and positive four-group zoom lenses, and JP-A-2009-156891 and JP-A-2010-237453, for example, describe positive, negative, positive, negative, and positive five-group zoom lenses.

In a positive, negative, positive, and positive four-group zoom lens, the second lens group is mainly responsible for magnification changing operation. In this case, increasing the power of the second lens group for size reduction and a higher magnification ratio disadvantageously results in insufficient correction of aberrations produced by the second lens group itself and a difficulty in correcting change in off-axis aberrations that occurs when a lens position setting is changed. In the zoom lenses described in JP-A-2002-323656, JP-A-2003-241092, and JP-A-2007-114432, since the third lens group includes a positive power partial group and a negative power partial group, the combination of the third lens group and the fourth lens group has a power arrangement of a positive power partial group, a negative power partial group, and a positive power partial group. As a result, off-axis light fluxes passing through the first lens group in the wide angle end state shift away from the optical axis, disadvantageously resulting in an increase in the lens diameter of the first lens group. In a positive, negative, positive, negative, and positive power five-group zoom lens, since the combination of the third lens group to the fifth lens group has the same power arrangement, it is also difficult to reduce the lens diameter of the first lens group.

It is therefore desirable to provide a variable focal length lens system that includes a first lens group having a small lens diameter and has a small, lightweight configuration as a whole. It is also desirable to provide an imaging apparatus having the same advantages.

SUMMARY

An embodiment of the present disclosure is directed to a variable focal length lens system including a first lens group having positive power, a second lens group having negative power, a third lens group having positive power, and a fourth lens group having positive power sequentially arranged from a side where an object is present. An aperture stop is disposed between the second lens group and the third lens group. The first to fourth lens groups are so moved that the distance between the first lens group and the second lens group increases, the distance between the second lens group and the third lens group decreases, and the distance between the third lens group and the fourth lens group decreases when a lens position setting is changed from a wide angle end state to a telescopic end state. The third lens group includes a negative lens and a positive lens disposed on the image side thereof. The variable focal length lens system satisfies the following conditional expression:

$$0.35 < f3/|f3a| < 0.8 \tag{1}$$

where f3a represents the focal length of the negative lens disposed in the third lens group, and f3 represents the focal length of the third lens group.

Another embodiment of the present disclosure is directed to an imaging apparatus including a variable focal length lens system and an imaging device that outputs a captured signal according to an optical image formed by the variable focal length lens system, and the variable focal length lens system is formed of the variable focal length lens system according to the embodiment of the present disclosure described above.

In the variable focal length lens system or the imaging apparatus according to the embodiments of the present disclosure, the power is arranged in the order of positive, negative, positive, and positive from the object side, and the first to fourth lens groups are so moved that the distance between the first lens group and the second lens group increases, the distance between the second lens group and the third lens group decreases, and the distance between the third lens group and the fourth lens group decreases when the lens position setting is changed from the wide angle end state to the telescopic end state.

According to the variable focal length lens system or the imaging apparatus according to the embodiments of the present disclosure, four lens groups having positive, negative, positive, and positive power are sequentially arranged from the object side, and the configuration of each of the lens groups is optimized, whereby the lens diameter of the first lens group can be reduced and the lens system can be compact and lightweight as a whole.

BRIEF DESCRIPTION OF THE DRAWINGS

FIG. 3 shows a third exemplary configuration of the variable focal length lens system and is a lens cross-sectional view corresponding to Numerical Example 3;

FIGS. 4A and 4B are descriptive diagrams showing the power arrangement of lens groups along with the movement thereof when the magnification is changed, FIG. 4A showing a wide angle end state and FIG. 4B showing a telescopic end state;

FIG. 5A is a descriptive diagram showing the power arrangement of the lens groups, and FIG. 5B is a descriptive diagram showing the power arrangement when the object-image relationship is reversed;

FIG. 6A is a descriptive diagram showing the power arrangement of a five-group zoom lens as a comparative example, and FIG. 6B is a descriptive diagram showing the power arrangement when the object-image relationship is reversed;

FIGS. 7A to 7D are aberration diagrams showing aberrations in the wide angle end state produced by the variable focal length lens system corresponding to Numerical Example 1, FIG. 7A showing spherical aberration, FIG. 7B showing astigmatism, FIG. 7C showing distortion, and FIG. 7D showing lateral aberrations;

FIGS. 8A to 8D are aberration diagrams showing aberrations in an intermediate focal length state produced by the variable focal length lens system corresponding to Numerical Example 1, FIG. 8A showing spherical aberration, FIG. 8B showing astigmatism, FIG. 8C showing distortion, and FIG. 8D showing lateral aberrations;

FIGS. 9A to 9D are aberration diagrams showing aberrations in the telescopic end state produced by the variable focal length lens system corresponding to Numerical Example 1, FIG. 9A showing spherical aberration, FIG. 9B showing astigmatism, FIG. 9C showing distortion, and FIG. 9D showing lateral aberrations;

FIGS. 10A to 10D are aberration diagrams showing aberrations in the wide angle end state produced by the variable focal length lens system corresponding to Numerical Example 2, FIG. 10A showing spherical aberration, FIG. 10B showing astigmatism, FIG. 10C showing distortion, and FIG. 10D showing lateral aberrations;

FIGS. 11A to 11D are aberration diagrams showing aberrations in the intermediate focal length state produced by variable focal length lens system corresponding to Numerical Example 2, FIG. 11A showing spherical aberration, FIG. 11B showing astigmatism, FIG. 11C showing distortion, and FIG. 11D showing lateral aberrations;

FIGS. 12A to 12D are aberration diagrams showing aberrations in the telescopic end state produced by the variable focal length lens system corresponding to Numerical Example 2, FIG. 12A showing spherical aberration, FIG. 12B showing astigmatism, FIG. 12C showing distortion, and FIG. 12D showing lateral aberrations;

FIGS. 13A to 13D are aberration diagrams showing aberrations in the wide angle end state produced by the variable focal length lens system corresponding to Numerical Example 3, FIG. 13A showing spherical aberration, FIG. 13B showing astigmatism, FIG. 13C showing distortion, and FIG. 13D showing lateral aberrations;

FIGS. 14A to 14D are aberration diagrams showing aberrations in the intermediate focal length state produced by the variable focal length lens system corresponding to Numerical Example 3, FIG. 14A showing spherical aberration, FIG. 14B showing astigmatism, FIG. 14C showing distortion, and FIG. 14D showing lateral aberrations;

FIGS. 15A to 15D are aberration diagrams showing aberrations in the telescopic end state produced by the variable focal length lens system corresponding to Numerical Example 3, FIG. 15A showing spherical aberration, FIG. 15B showing astigmatism, FIG. 15C showing distortion, and FIG. 15D showing lateral aberrations.

DETAILED DESCRIPTION

Figure 1:
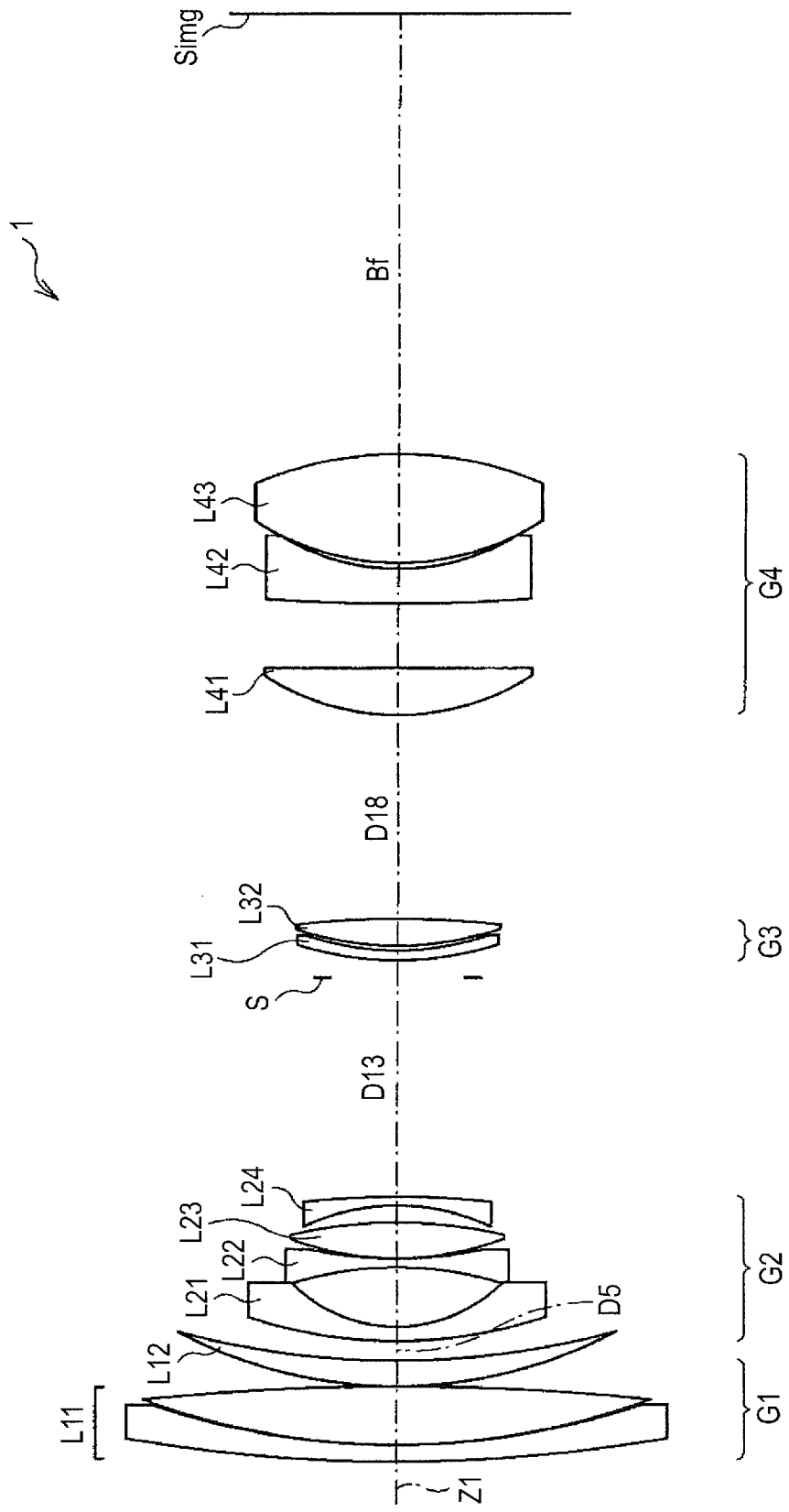
FIG. 1 shows a first exemplary configuration of a variable focal length lens system according to an embodiment of the present disclosure and is a lens cross-sectional view corresponding to Numerical Example 1.
Figure 2:
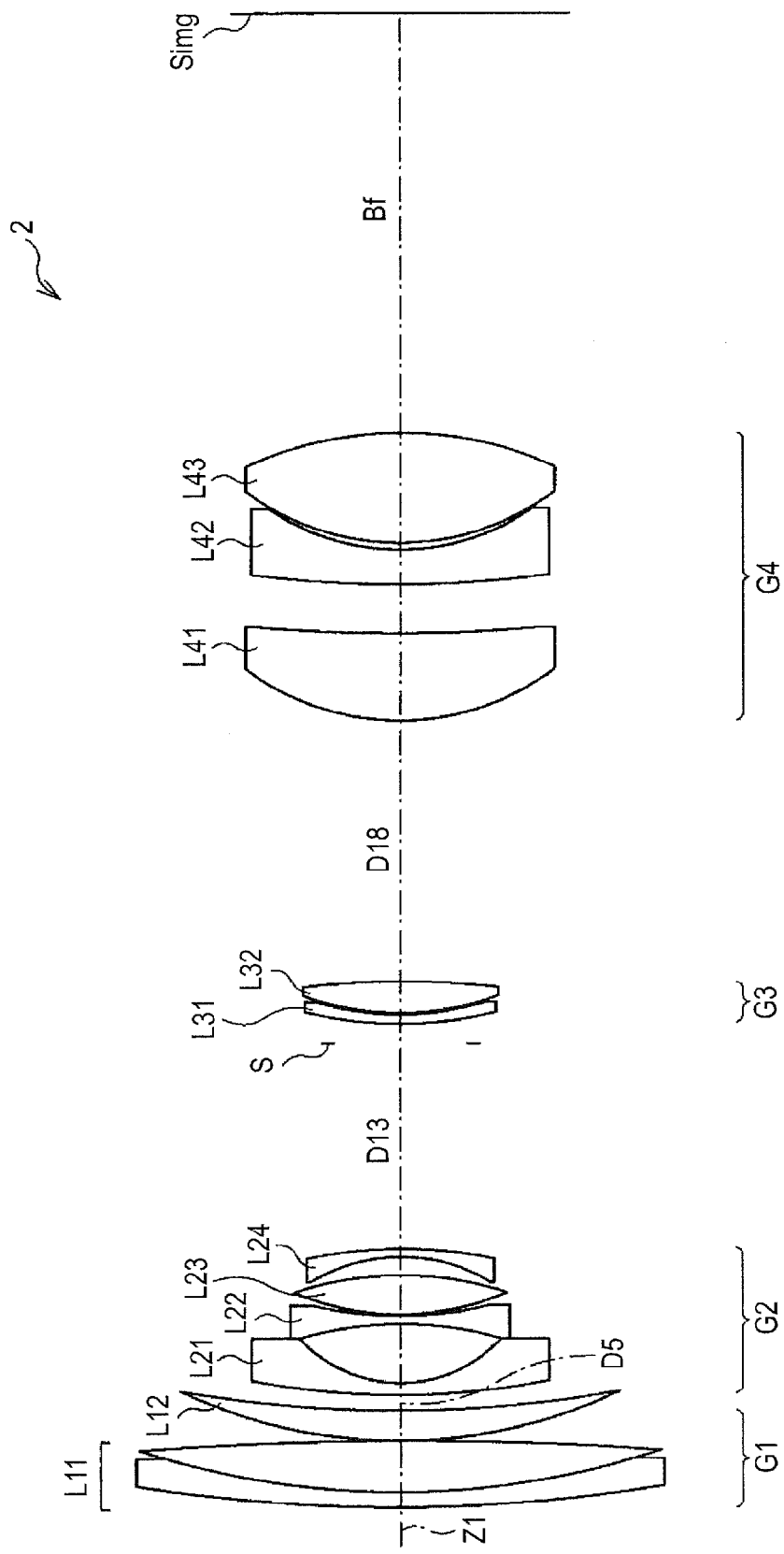
FIG. 2 shows a second exemplary configuration of the variable focal length lens system and is a lens cross-sectional view corresponding to Numerical Example 2.

An embodiment of the present disclosure will be described below in detail with reference to the drawings.
Basic Configuration of Lens FIG. 1 shows a first exemplary configuration of a variable focal length lens system according to an embodiment of the present disclosure. The exemplary configuration corresponds to a lens configuration according to Numerical Example 1, which will be described later. FIG. 1 corresponds to the lens layout at the wide angle end where an object at infinity is brought into focus. Similarly, FIGS. 2 and 3 show second and third exemplary cross-sectional configurations corresponding to lens configurations according to Numerical Examples 2 and 3, which will be described later. In FIGS. 1 to 3, reference character Simg denotes the image plane. Reference characters D5, D13, and D18 each denote the inter-surface distance between portions that move when the magnification is changed. Reference character Bf denotes the back focal distance (distance from last lens surface to image plane Simg).

The variable focal length lens system according to the present embodiment practically includes the following four lens groups sequentially arranged from the object side along an optical axis Z1: a first lens group G1 having positive power; a second lens group G2 having negative power; a third lens group G3 having positive power; and a fourth lens group G4 having positive power.

An aperture stop S is disposed between the second lens group G2 and the third lens group G3. The aperture stop S moves integrally with the third lens group G3 when the magnification is changed and hence the lens position setting is changed.

FIGS. 4A and 4B show the power arrangement of the lens groups along with the movement thereof when the magnification is changed. When the lens position setting is changed from the wide angle end state (FIG. 4A), in which the focal length of the lens system is minimized, to the telescopic end state (FIG. 4B), in which the focal length is maximized, all the lens groups are so moved that the distance D5 between the first lens group G1 and the second lens group G2 increases, the distance D13 between the second lens group G2 and the third lens group G3 decreases, and the distance D18 between the third lens group G3 and the fourth lens group G4 decreases.

Function of Each Lens Group

The function of each of the lens groups will next be described. In the variable focal length lens system according to the present embodiment, the first lens group G1 and the second lens group G2 are so configured that they approach each other in the wide angle end state, and off-axis light fluxes incident on the first lens group G1 in positions close to the optical axis Z1. As a result, the lens diameter of the first lens group G1 can be reduced. At the same time, the first lens group G1 and the second lens group G2 are so configured that they move away from each other when the lens position setting is changed from the wide angle end state to the telescopic end state, and the off-axis light fluxes having passed through the first lens group G1 shift away from the optical axis Z1. In the present embodiment, by using the change in height of off-axis light fluxes with respect to the optical axis described above, change in off-axis aberrations that occurs when the lens position setting is changed is corrected in a satisfactory manner.

In particular, the off-axis light fluxes incident on the first lens group G1 in the wide angle end state, in which the angle of view is large, are designed not to shift from the optical axis Z1 by a large amount by reducing the total length of the lens system in the wide angle end state whereas increasing the total length in the telescopic end state.

Further, when the second lens group G2 and the third lens group G3 are so configured that they move away from each other in the wide angle end state, the off-axis light fluxes having passed through the second lens group G2 shift away from the optical axis Z1. As a result, axial aberrations and off-axis aberrations can be corrected independently. Further, when the second lens group G2 and the third lens group G3 are so configured that they approach each other when the lens position setting is changed toward the telescopic end state, the off-axis light fluxes having passed through the second lens group G2 shift toward the optical axis Z1. In this way, change in off-axis aberrations that occurs when the lens position setting is changed as described above can be corrected in a satisfactory manner, whereby the performance of the lens system can be improved.

Since each of the third lens group G3 and the fourth lens group G4 has positive power, changing the distance therebetween is unlikely to contribute to magnification change. In the present embodiment, the off-axis light fluxes having passed through the fourth lens group G4 shift away from the optical axis Z1 when the third lens group G3 and the fourth lens group G4 are so configured that they move away from each other in the wide angle end state. In this way, change in off-axis aberrations that occurs when the angle of view changes is corrected. Further, since the off-axis light fluxes having passed through the fourth lens group G4 shift toward the optical axis Z1 when the lens position setting is changed toward the telescopic end state, change in off-axis aberrations that occurs when the lens position setting is changed is suppressed.

The third lens group G3, which is disposed in the vicinity of the aperture stop S, primarily corrects axial aberrations. The reason for this is that off-axis light fluxes and axial light fluxes pass through the third lens group G3 at substantially the same height.

To reduce the size of the lens system by reducing the lens diameter of the first lens group G1 in the wide angle end state based on the configuration described above, the lens system in the present embodiment is configured as follows.

[A] The third lens group G3 includes a negative lens L31 and a positive lens L32 disposed on the image side thereof.

[B] The ratio of the focal length of the third lens group G3 to the focal length of the fourth lens group G4 is set appropriately.

When an imaging device is used to record a subject image, it is necessary to set the exit pupil distance appropriately, as described above. Specifically, it is necessary not to truncate light fluxes passing through each on-chip lens by establishing a state in which the position of the exit pupil is far away from the image plane, that is, a state in which the principal ray having exited out of the last lens is nearly parallel to the optical axis Z1. If the exit pupil is positioned at infinity, in which the optical system works as an image-side telecentric system, and a collimated light flux is incident from the image plane side, the light flux is focused at a point where the stop is located. Provided that the image height is fixed, the longer the focal length, the smaller the angle between the principal ray and the optical axis Z1 in the position of the stop. Now consider the principal ray on the object side. The smaller the angle described above, the closer off-axis light fluxes incident on the first lens group G1 shift toward the optical axis Z1.

The off-axis light fluxes incident on the first lens group G1 therefore shift toward the optical axis Z1 and the size of the lens system can be reduced accordingly by increasing the combined focal length of the third lens group G3 and the fourth lens group G4, which are located away from the aperture stop S toward the image side, to reduce the angle of the principal ray in the position of the aperture stop described above.

More specifically, it is desirable that the third lens group G3 has small positive power and includes a negative lens L31 and a positive lens L32 disposed on the image side thereof. By configuring the third lens group G3 as described above, the third lens group G3 and the fourth lens group G4 as a whole have nearly a telescopic power arrangement when the object-image relationship shown in FIG. 5A is reversed to the relationship shown in FIG. 5B. The reason why the lens system of the present embodiment employs the configuration described above is that the total length of the lens system increases if the third lens group G3 has negative power.

In a positive, negative, positive, negative, positive five-group zoom lens, for example, the third lens group G3 to the fifth lens group G5 disposed away from the aperture stop S toward the image side have a positive, negative, and positive triplet configuration when the object-image relationship in FIG. 6A is reversed to the relationship shown in FIG. 6B, which means that increasing the focal length disadvantageously leads to an increase in the lens length from the third lens group G3 to the fifth lens group G5. In contrast, the lens system of the present embodiment employs the telescopic power arrangement shown in FIG. 5B. As a result, an increase in the length of the lens system is suppressed while the combined focal length of the third lens group G3 and the fourth lens group G4 is increased.

In view of the above discussion, it is important to satisfy the conditions [A] and [B] described above in the present embodiment.

Description of Conditional Expressions

A description will next be made of conditional expressions that the variable focal length lens system according to the present embodiment satisfies.

The variable focal length lens system according to the present embodiment satisfies the following conditional expression (1).

$$0.35 < f3/|f3a| < 0.8 \quad (1)$$

In Expression (1), f3a represents the focal length of the negative lens L31 disposed in the third lens group G3, and f3 represents the focal length of the third lens group G3.

When the conditional expression (1) is satisfied, the principal ray passes through the aperture stop at a small angle, and hence the first lens group G1 has a small lens diameter. When f3/|f3a| is smaller than the lower limit of the conditional expression (1), off-axis light fluxes passing through the first lens group G1 shift away from the optical axis Z1, resulting in insufficient size reduction. Conversely, when f3/|f3a| is greater than the upper limit of the conditional expression (1), light convergence in the third lens group G3 decreases, disadvantageously resulting in an increase in the total length of the lens system in the wide angle end state.

It is desirable in the present embodiment that the upper limit of the conditional expression (1) is set at 0.7 as shown in the following conditional expression (1)' to correct negative spherical aberration produced by the third lens group G3 in a more satisfactory manner for higher performance of the lens system.

$$0.35 < f3/|f3a| < 0.7 \quad (1)'$$

The variable focal length lens system according to the present embodiment desirably satisfies the following conditional expression (2).

$$0.5 < f4/f3 < 0.8 \quad (2)$$

In Expression (2), f4 represents the focal length of the fourth lens group G4.

The conditional expression (2) defines the ratio between the focal length of the third lens group G3 and the focal length of the fourth lens group G4 for optimization of the lens diameter of the first lens group G1. When f4/f3 is smaller than the lower limit of the conditional expression (2), off-axis light fluxes passing through the fourth lens group G4 shift away from the optical axis Z1. As a result, the lens diameter of the fourth lens group G4 exceeds the inner diameter of a lens mount. In this case, a predetermined amount of light is not ensured at the periphery. When f4/f3 is greater than the upper limit of the conditional expression (2), the principal ray passes through the aperture stop at a large angle. In this case, the lens diameter of the first lens group G1 increases, which is against the intention of the present embodiment.

It is desirable in the present embodiment that the lower limit of the conditional expression (2) is set at 0.55 as shown in the following conditional expression (2)' to correct comma produced at the periphery of the screen in the wide angle end state in a satisfactory manner for higher performance of the lens system.

$$0.55 < f4/f3 < 0.8 \quad (2)'$$

In the present embodiment, to correct aberrations produced by the third lens group G3 alone in a satisfactory manner, it is desirable that the image-side lens surface of the negative lens L31 in the third lens group G3 is concave toward the image side and the object-side lens surface of the positive lens L32 in the third lens group G3 is convex toward the object side. Further, the following conditional expression (3) is desirably satisfied.

$$0.03 < (R33-R32)/(R33+R32) < 0.18 \quad (3)$$

In Expression (3), R33 represents the radius of curvature of the object-side lens surface of the positive lens L32 disposed in the third lens group G3, and R32 represents the radius of curvature of the image-side lens surface of the negative lens L31 disposed in the third lens group G3.

The conditional expression (3) defines the shape of the air separation formed between the negative lens L31 and the positive lens L32 in the third lens group G3. When (R33−R32)/(R33+R32) is smaller than the lower limit of the conditional expression (3), it is difficult to correct negative spherical aberration produced by the third lens group G3 in a satisfactory manner, resulting in insufficient enhancement in performance of the lens system. Conversely, when (R33−R32)/(R33+R32) is greater than the upper limit of the conditional expression (3), the sine condition for the third lens group G3 is not satisfied. As a result, it is difficult to correct comma produced at the periphery of the screen in a satisfactory manner, resulting in no enhancement in performance of the lens system.

To prevent the performance of the zoom lens from being degraded by eccentricity between the third lens group G3 and the fourth lens group G4 relative to each other, it is desirable in the present embodiment that the fourth lens group G4 is formed of the following three lenses sequentially arranged from the object side: a first positive lens L41 having a surface convex toward the object side; a negative lens L42 having a surface concave toward the image side, and a second positive lens L43 having convex surfaces on both sides. Further, the following conditional expression (4) is desirably satisfied.

$$1 < Da/R44 < 2.8 \quad (4)$$

In Expression (4), Da represents the length along the optical axis Z1 from the aperture stop S to the image-side lens surface of the negative lens L42 disposed in the fourth lens group G4 in the wide angle end state, and R44 represents the radius of curvature of the image-side lens surface of the negative lens L42 disposed in the fourth lens group G4.

The shortest way to prevent the performance of the lens system from being degraded by the relative eccentricity is configuring the fourth lens group G4 to self-correct aberrations. In the present embodiment, the fourth lens group G4, when it has a triplet configuration, can self-correct aberrations in a satisfactory manner. Further, reducing the number of lenses that form the lens system reduces manufacture variations for stable optical quality. Since a positive, negative, positive, positive four-group zoom lens has an asymmetrical power arrangement as the entire lens system, negative distortion tends to occur in the wide angle end state. In the present embodiment, the negative distortion is corrected because the negative lens L42 disposed in the fourth lens group G4 has a surface concave toward the image side. More specifically, the conditional expression (4) is desirably satisfied.

When Da/R44 is greater than the upper limit of the conditional expression (4), off-axis light fluxes passing through the negative lens L42 shift away from the optical axis Z1. In this case, the amount of comma produced by the image-side lens surface of the negative lens L42 increases, resulting in insufficient enhancement in optical performance of the lens system at the periphery of the screen. Conversely, when Da/R44 is smaller than the lower limit of the conditional expression (4), the negative distortion may not be corrected in a satisfactory manner in the wide angle end state. In this case, predetermined optical performance is not achieved.

The following conditional expression (5) is desirably satisfied for higher performance of the lens system.

$$0.9<R41/fw<1.8 \quad (5)$$

In Expression (5), R41 represents the radius of curvature of the object-side lens surface of the first positive lens L41 disposed in the fourth lens group G4, and fw represents the focal length of the entire lens system in the wide angle end state.

The conditional expression (5) defines the shape of the first positive lens L41 disposed in the fourth lens group G4. When the fourth lens group G4 is so configured that off-axis light fluxes passing therethrough in the wide angle end state shift away from the optical axis Z1, axial aberrations and off-axis aberrations can be corrected independently for higher performance of the lens system. When the off-axis light fluxes shift too much from the optical axis Z1, however, they are truncated by the lens mount. To address the problem, the first positive lens L41 in the fourth lens group G4 in the present embodiment causes off-axis light fluxes to converge. When R41/fw is greater than the upper limit of the conditional expression (5), the off-axis light fluxes having exited out of the fourth lens group G4 shift away from the optical axis Z1. In this case, the off-axis light fluxes are truncated by the lens mount. The degree of truncation can be reduced to some extent by increasing the distance between the first positive lens L41 and the negative lens L42, but the total length of the lens system increases in this case. When R41/fw is smaller than the lower limit of the conditional expression (5), the first positive lens L41 causes the off-axis light fluxes to converge by a greater amount. As a result, axial aberrations and off-axis aberrations may not be corrected independently, resulting in no enhancement in performance of the lens system.

Further, in the present embodiment, to prevent degradation in performance of the zoom lens due to assembly-related variations at the time of manufacture of the zoom lens and achieve stable optical quality, the lower limit of the conditional expression (5) is desirably set at 1.1 as shown in the following conditional expression (5)'. The reason for this is that the eccentricity between the first positive lens L41 and the negative lens L42 relative to each other greatly degrades the performance of the lens system.

$$1.1<R41/fw<1.8 \quad (5)'$$

In the present embodiment, the lens diameter of the first lens group G1 can be further reduced by reducing the thickness of the second lens group G2. Specifically, it is desirable that the second lens group G2 is formed of the following four lenses sequentially arranged from the object side: a first negative lens L21 having a surface concave toward the image side; a second negative lens L22 having a surface concave toward the object side; a positive lens L23 having convex surfaces on both sides; and a third negative lens L24 having a surface concave toward the object side, and that the following conditional expression (6) is satisfied.

$$-0.65<fw/R23<-0.35 \quad (6)$$

In Expression (6), R23 represents the radius of curvature of the object-side lens surface of the second negative lens L22 disposed in the second lens group G2.

In the present embodiment, to correct aberrations produced by the second lens group G2 in a satisfactory manner and reduce the diameter of the first lens group G1, it is desirable to configure the second lens group G2 as described above. In this case, the second lens group G2 includes a first partial group formed of the first negative lens L21 and a second partial group formed of the second negative lens L22, the positive lens L23, and the third negative lens L24. In this case, since the first partial group is located away from the aperture stop S in the wide angle end state, the height of each light ray passing through the first partial group greatly changes as the angle of view changes. Off-axis aberrations are corrected primarily by using the behavior of the light rays passing through the first partial group described above. The second partial group, which is disposed in the vicinity of the aperture stop S, primarily corrects axial aberrations. The second group G2 therefore desirably employs a triplet configuration, as described above.

In the present embodiment, the thus configured second lens group G2, in which each of the lens groups is clearly intended to correct specific aberration, provides satisfactory image forming performance. The conditional expression (6) defines the shape of the second negative lens L22 disposed in the second lens group G2. When fw/R23 is smaller than the lower limit of the conditional expression (6), off-axis light fluxes incident on the second lens group G2 in the wide angle end state shift away from the optical axis Z1, and the radius of curvature of the image-side lens surface of the first negative lens L21 decreases, resulting in a large thickness of the second lens group G2. As a result, off-axis light fluxes incident on the first lens group G1 shift away from the optical axis Z1, resulting in no further reduction of the lens diameter of the first lens group G1. Conversely, when fw/R23 is greater than the upper limit of the conditional expression (6), the thickness of the second lens group G2 can be reduced, but the object-side lens surface of the second negative lens L22 becomes a steep concave surface for the aperture stop S. In this case, comma is produced at the periphery of the screen, resulting in a difficulty in further enhancement in performance of the lens system.

As described above, according to the present embodiment, since the four lens groups having positive, negative, positive, and positive power are sequentially arranged from the object side and the configuration of each of the lens groups is optimized, the lens diameter of the first lens group can be reduced and the lens system can be compact and lightweight as a whole.

Desirable Configuration of Each Lens Group

In the present embodiment, each of the lens groups is desirably configured as follows to achieve both high optical performance and compactness.

In the present embodiment, the first lens group G1 desirably includes a doublet L11 formed of a negative lens and a positive lens and a single positive lens L12 disposed on the image side of the doublet L11 sequentially arranged from the object side for higher performance of the lens system. The first lens group G1 tends to produce negative spherical aberration because axial light fluxes having wide light flux diameters are incident thereon particularly in the telescopic end state. Further, since the off-axis light fluxes are incident on portions apart from the optical axis Z1, off-axis aberrations tend to occur. In the present embodiment, the doublet L11, which is formed of a negative lens and a positive lens and disposed in a position closest to an object in the first lens group G1, corrects the negative spherical aberration and axial chromatic aberration in a satisfactory manner. The single positive lens L12 disposed on the image side of the doublet L11 primarily corrects change in comma that occurs when the angle of view changes in a satisfactory manner. The lenses in the first lens group G1 therefore have the respective specific function to achieve higher optical performance. For still higher performance, the doublet L11 in the first lens group G1 is desirably replaced with separate two lenses, that is, negative and positive lenses.

In the present embodiment, change in comma that occurs when the angle of view changes in the wide angle end state can be corrected in a satisfactory manner by using an aspheric lens as the first negative lens L21 disposed in the second lens group G2 in a position closest to an object. Further, comma produced at the periphery of the screen in the wide angle end state can be corrected in a satisfactory manner by using an aspheric surface as the object-side lens surface of the negative lens L42 disposed in the fourth lens group G4. Moreover, higher optical performance of the lens system can be naturally achieved by using a plurality of aspheric surfaces.

In the present embodiment, the second lens group G2 is desirably moved along the optical axis Z1 as the distance to a subject changes. The reason for this is that focusing can be performed with a small travel of the second lens group G2.

In the present embodiment, the first lens group G1 is desirably made of a glass material having highly anomalous dispersion to correct chromatic aberrations in a more satisfactory manner. In particular, among the lenses that form the first lens group G1, forming the positive lens in the doublet L11 by using a glass material having highly anomalous dispersion allows secondary dispersion produced in a central portion of the screen in the telescopic end state to be corrected in a satisfactory manner. Further, to correct chromatic aberrations in the wide angle end state in a satisfactory manner, it is desirable to form the fourth lens group G4 by using a glass material having highly anomalous dispersion.

In the variable focal length lens system according to the present embodiment, the position of an image can be shifted by shifting one of the lens groups that form the lens system or a lens component that is part of the one lens group in a direction substantially perpendicular to the optical axis Z1. In particular, in the present embodiment, when the third lens group G3 is shifted in a direction substantially perpendicular to the optical axis Z1, aberrations do not greatly change. The zoom lens capable of shifting an image combined with a detection system, a computation system, and a drive system can therefore function as an anti-vibration camera that corrects image blur due, for example, to hand shaking that occurs when a shutter release button is pressed. The detection system detects a shake angle of the camera and outputs hand-shaking information. The computation system outputs lens position information necessary to correct the hand-shaking based on the hand-shaking information. The lens system capable of shifting an image is a lens system capable of shifting one of the lens groups that form the lens system or part of the one lens group as a shift lens group in a direction substantially perpendicular to the optical axis Z1 and designed to minimize change in performance of the lens system that occurs when the shift lens group is shifted. The drive system shifts the lens shift group by an amount based on the lens position information.

Figure 16:
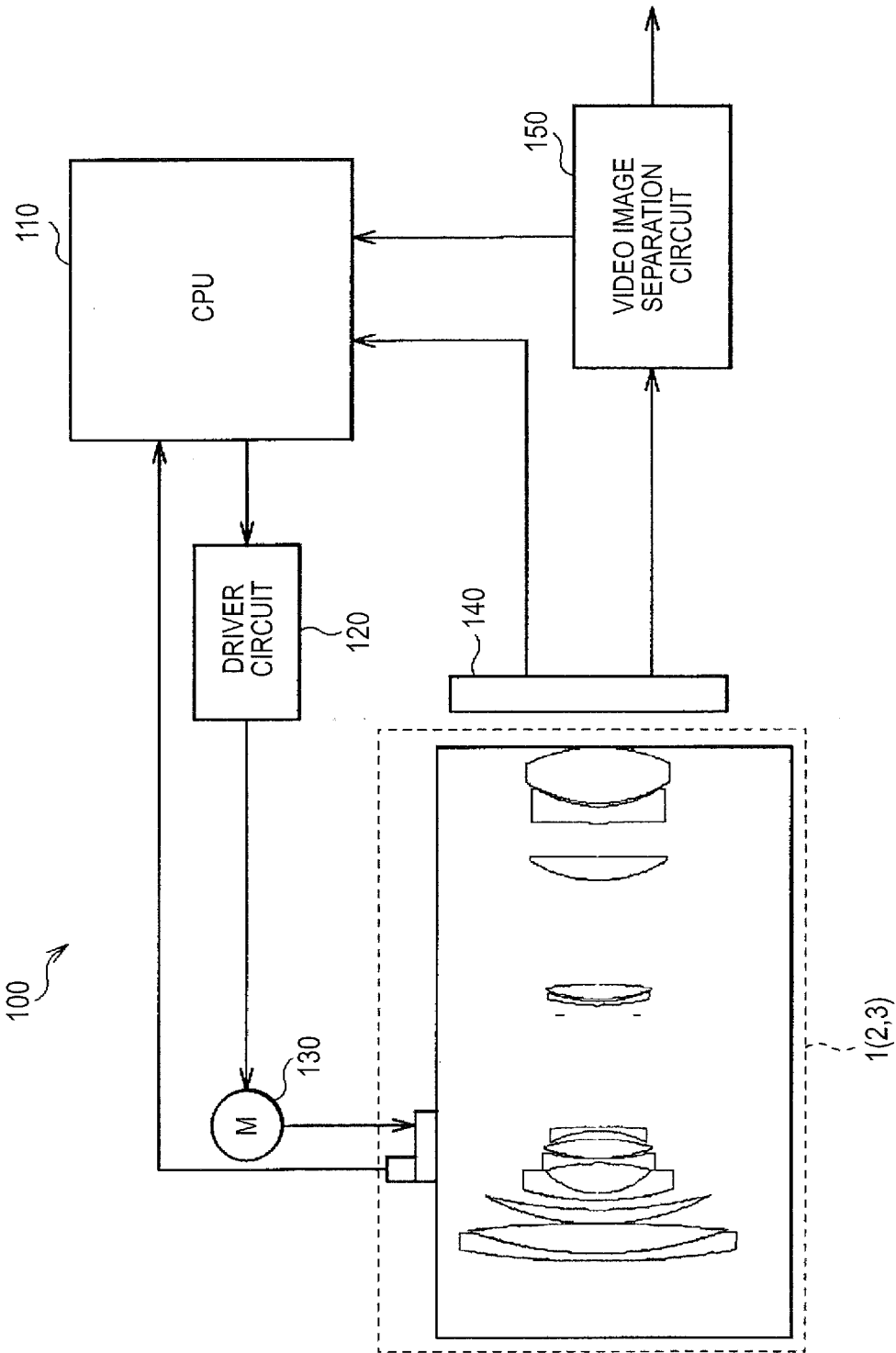
FIG. 16 is a block diagram showing an exemplary configuration of an imaging apparatus.

Further, it is, of course, possible to provide a lowpass filter for preventing moire fringes from occurring on the image side of the lens system and an infrared blocking filter depending on the spectral sensitivity characteristics of a light detector.
Example of Incorporation of Variable Focal Length Lens System into Imaging Apparatus FIG. 16 shows an exemplary configuration of an imaging apparatus 100 into which the variable focal length lens system according to the present embodiment is incorporated. The imaging apparatus 100 is, for example, a digital still camera and includes a CPU (central processing unit) 110 that performs centralized control of the entire imaging apparatus 100, an imaging device 140 that converts an optical image formed through the variable focal length lens system 1 shown in FIG. 1 (or variable focal length lens system 2 shown in FIG. 2 or variable focal length lens system 3 shown in FIG. 3) into an electric signal, and a video image separation circuit 150 to which the electric signal is sent. The imaging device 140 is formed of CCD (charge coupled device), CMOS (complementary metal-oxide semiconductor), or any other photoelectric conversion devices. The video image separation circuit 150 not only produces a focus control signal based on the electric signal and sends the focus control signal to the CPU 110 but also produces a video image signal corresponding to a video image portion of the electric signal and sends the video image signal to a downstream video image processing circuit (not shown). The video image processing circuit converts the video image signal into data in a signal format appropriate for the following processing, such as displaying the data on a display section, recording the data on a predetermined recording medium, and transferring the data via a predetermined communication interface.

The CPU 110 receives an operation signal, such as a focusing signal, from an external unit and performs a variety of types of processing in accordance with the operation signal. The CPU 110, for example, when it receives the focusing operation signal in response to user's operation on a focusing button, operates a drive motor 130 via a driver circuit 120 to achieve a focused state according to the instruction. The CPU 110 in the imaging apparatus 100 thus moves a focus lens group (second lens group G2, for example) along the optical axis in response to the focusing operation signal. Further, the CPU 110 in the imaging apparatus 100 feeds back information on the current position of the focus lens group and refers to the information when moving the focus lens group via the drive motor 130 next time. Similarly, the CPU 110, when it receives a zooming operation signal, operates the drive motor 130 via the driver circuit 120.

The imaging apparatus 100 further includes a shake detection unit that detects shaking of the apparatus resulting from hand-shaking. The CPU 110 operates the drive motor 130 via the driver circuit 120 based on a signal output from the shake detection unit. The CPU 110 thus moves an anti-vibration lens group (third lens group G3, for example) in the direction perpendicular to the optical axis Z1 in accordance with the amount of shaking.

The above embodiment has been described with reference to the case where the imaging apparatus 100 is specifically a digital still camera, but the imaging apparatus 100 is not limited thereto and may specifically be a variety of other electronic apparatus. For example, the imaging apparatus 100 may specifically be a camera with an interchangeable lens; a digital video camcorder; a mobile phone, a PDA (personal digital assistant), and a variety of other electronic apparatus into which a digital video camcorder or the like is incorporated.

EXAMPLES

Specific numerical examples of the variable focal length lens system according to the present embodiment will next be described.

The meanings and other information of the symbols shown in the following tables and descriptions are as follows: "Surface number" denotes the number of an i-th surface with "i"

starting from 1 representing the component surface closest to an object and sequentially incrementing in the direction toward an image. "Radius of curvature" denotes the radius of curvature (mm) of an i-th surface. "Inter-surface distance" denotes the distance (mm) along the optical axis between an i-th surface and an (i+1)-th surface. "Refractive index" denotes the refractive index of the material of an optical component having an i-th surface at the d line (wavelength: 587.6 nm). "Abbe number" denotes the Abbe number of the material of an optical component having an i-th surface at the d line. Bf denotes the back focal length (distance from last lens surface to image plane Simg).

A field where "radius of curvature" is 0 means that the surface is a flat surface or a stop surface. "Surface number" with "STO" represents a stop surface. A surface number with "*" represents an aspheric surface, and the shape of an aspheric surface is expressed by the following expression. In aspheric coefficient data, symbol "E" means that the following numerical value is the "exponent" of base 10 and that the numerical value expressed by the exponent function using base 10 is multiplied by the numerical value preceding "E". For example, "1.0E-05" represents "$1.0 \times 10^{-5}$."

(Expression of Aspheric Surface)

$$X = cy^2/(1+(1-(1+k)c^2y^2)^{1/2}) + Ay^4 + By^6 + \ldots$$

where y denotes the height from the optical axis Z1, x denotes the sag, c denotes the curvature, k denotes a conic constant, and A, B, ... denote aspheric coefficients.

Numerical Example 1

"Table 1" to "Table 3" show specific lens data corresponding to the variable focal length lens system 1 according to the first exemplary configuration shown in FIG. 1. In particular, "Table 1" shows basic lens data on the variable focal length lens system 1, and "Table 2" shows data on aspheric surfaces thereof. "Table 3" shows other data. Since the variable focal length lens system 1 is so configured that the lens groups are moved when the magnification is changed, the inter-surface distances in front of and behind the lens groups are variable. "Table 3" shows data on the variable inter-surface distances.

In the variable focal length lens system 1, the first lens group G1 includes a doublet L11 formed of a negative meniscus lens having a surface convex toward the object side and a positive lens having a surface convex toward the object side and a positive meniscus lens L12 having a surface convex toward the object side. The second lens group G2 includes a meniscus-shaped first negative lens L21 having a surface convex toward the object side, a second negative lens L22 having concave surfaces on both sides, a positive lens L23 having convex surfaces on both sides, and a meniscus-shaped third negative lens L24 having a surface concave toward the object side. The third lens group G3 includes a negative meniscus lens L31 having a surface convex toward the object side and a positive lens L32 having convex surfaces on both sides. The fourth lens group G4 includes a first positive lens L41 having a surface convex toward the object side, a negative lens L42 having a surface concave toward the image side, and a second positive lens L43 having convex surfaces on both sides. The aperture stop S is disposed between the second lens group G2 and the third lens group G3 and moves integrally with the third lens group G3 when the lens position setting is changed. The sixth surface and the twenty-first surface are aspheric surfaces.

TABLE 1

| | | | Example 1 | | |
|---|---|---|---|---|---|
| Lens group | Surface number | Radius of curvature | Intersurface distance | Refractive index | Abbe number |
| G1 | 1 | 153.9387 | 1.30 | 1.84666 | 23.83 |
| | 2 | 64.3709 | 5.20 | 1.61800 | 63.40 |
| | 3 | −267.6669 | 0.10 | | |
| | 4 | 41.7250 | 2.50 | 1.75500 | 52.30 |
| | 5 | 75.7410 | (D5) | | |
| G2 | *6 | 54.5588 | 1.15 | 1.81600 | 46.62 |
| | 7 | 12.5732 | 5.35 | | |
| | 8 | −35.6710 | 0.75 | 1.88300 | 40.77 |
| | 9 | 42.4133 | 0.10 | | |
| | 10 | 25.9546 | 3.45 | 1.80810 | 22.76 |
| | 11 | −30.0727 | 1.46 | | |
| | 12 | −17.1481 | 0.75 | 1.81600 | 46.62 |
| | 13 | −57.6169 | (D13) | | |
| | 14(STO) | 0.0000 | 1.60 | | |
| G3 | 15 | 35.9163 | 0.80 | 2.00069 | 25.46 |
| | 16 | 25.8859 | 0.35 | | |
| | 17 | 30.2906 | 2.55 | 1.59282 | 68.62 |
| | 18 | −78.4084 | (D18) | | |
| G4 | 19 | 23.0000 | 4.02 | 1.55332 | 71.69 |
| | 20 | −778.8285 | 5.99 | | |
| | *21 | 173.7078 | 3.00 | 1.88300 | 40.77 |
| | 22 | 20.8382 | 0.50 | | |
| | 23 | 23.3724 | 9.64 | 1.49700 | 81.54 |
| | 24 | −31.1559 | (Bf) | | |

(*Aspheric surface)

TABLE 2

| | | Example 1/Aspheric surface data | | | |
|---|---|---|---|---|---|
| Surface number | k | A | B | C | D |
| 6 | −0.7240 | 0.853392E−05 | 0.205878E−07 | −0.200130E−09 | 0.133114E−11 |
| 21 | 1.0000 | −0.138229E−04 | 0.154450E−07 | −0.180353E−09 | 0.858685E−12 |

TABLE 3

| | Example 1 | | |
|---|---|---|---|
| | Wide angle end | Intermediate | Telescopic end |
| Focal length | 18.540 | 33.356 | 145.500 |
| Half angle of view | 38.877 | 22.816 | 5.503 |
| f-number | 3.595 | 4.366 | 5.814 |
| D5 | 1.708 | 13.133 | 41.052 |
| D13 | 19.609 | 11.878 | 0.800 |
| D18 | 18.257 | 9.088 | 1.100 |
| Bf | 39.757 | 52.482 | 82.477 |

"Table 4" shows values to be checked to see if they fall within the acceptable ranges defined by the conditional expressions described above for Numerical Example 1. As seen from "Table 4," the values in Numerical Example 1 fall within the acceptable ranges defined by the conditional expressions.

TABLE 4

| Conditional expressions | Example 1 |
|---|---|
| f1 | 79.354 |
| f2 | −13.000 |
| f3 | 60.780 |
| f4 | 42.355 |
| f3a | −96.475 |
| (1) f3/f3a | 0.630 |
| (2) f4/f3 | 0.697 |
| (3) (R33 − R32)/(R33 + R32) | 0.078 |
| (4) Da/R44 | 1.760 |
| (5) R41/fw | 1.241 |
| (6) fw/R23 | −0.520 |

Numerical Example 2

"Table 5" to "Table 7" show specific lens data corresponding to the variable focal length lens system 2 according to the second exemplary configuration shown in FIG. 2. In particular, "Table 5" shows basic lens data on the variable focal length lens system 2, and "Table 6" shows data on aspheric surfaces thereof. "Table 7" shows other data. Since the variable focal length lens system 2 is so configured that the lens groups are moved when the magnification is changed, the inter-surface distances in front of and behind the lens groups are variable. "Table 7" shows data on the variable inter-surface distances.

In the variable focal length lens system 2, the first lens group G1 includes a doublet L11 formed of a negative meniscus lens having a surface convex toward the object side and a positive lens having a surface convex toward the object side and a positive meniscus lens L12 having a surface convex toward the object side. The second lens group G2 includes a meniscus-shaped first negative lens L21 having a surface convex toward the object side, a second negative lens L22 having concave surfaces on both sides, a positive lens L23 having convex surfaces on both sides, and a meniscus-shaped third negative lens L24 having a surface concave toward the object side. The third lens group G3 includes a negative meniscus lens L31 having a surface convex toward the object side and a positive lens L32 having convex surfaces on both sides. The fourth lens group G4 includes a first positive lens L41 having a surface convex toward the object side, a negative lens L42 having a surface concave toward the image side, and a second positive lens L43 having convex surfaces on both sides. The aperture stop S is disposed between the second lens group G2 and the third lens group G3 and moves integrally with the third lens group G3 when the lens position setting is changed. The sixth surface and the twenty-first surface are aspheric surfaces.

TABLE 5

Example 2

| Lens group | Surface number | Radius of curvature | Intersurface distance | Refractive index | Abbe number |
|---|---|---|---|---|---|
| G1 | 1 | 162.3269 | 1.30 | 1.92286 | 20.80 |
| | 2 | 71.1226 | 4.64 | 1.61800 | 63.33 |
| | 3 | −374.1152 | 0.10 | | |
| | 4 | 45.1739 | 2.57 | 1.81600 | 46.62 |
| | 5 | 97.8402 | (D5) | | |
| G2 | *6 | 97.8402 | 1.15 | 1.81600 | 46.62 |
| | 7 | 12.2294 | 5.33 | | |
| | 8 | −33.9525 | 0.75 | 1.88300 | 40.77 |
| | 9 | 36.9369 | 0.10 | | |
| | 10 | 25.7232 | 3.47 | 1.80810 | 22.76 |
| | 11 | −28.3901 | 1.59 | | |
| | 12 | −16.5711 | 0.75 | 1.88300 | 40.77 |
| | 13 | −35.4645 | (D13) | | |
| | 14(STO) | 0.0000 | 1.60 | | |
| G3 | 15 | 32.9344 | 0.80 | 1.91082 | 35.25 |
| | 16 | 23.1087 | 0.32 | | |
| | 17 | 25.7959 | 2.92 | 1.51860 | 69.98 |
| | 18 | −62.2226 | (D18) | | |
| G4 | 19 | 23.1617 | 7.95 | 1.55332 | 71.69 |
| | 20 | 199.7331 | 4.59 | | |
| | *21 | 80.5756 | 3.00 | 1.91082 | 35.25 |
| | 22 | 20.9320 | 0.45 | | |
| | 23 | 22.9375 | 10.00 | 1.49700 | 81.54 |
| | 24 | −33.2396 | (Bf) | | |

(*Aspheric surface)

TABLE 6

Example 2/Aspheric surface data

| Surface number | k | A | B | C | D |
|---|---|---|---|---|---|
| 6 | −1.0000 | 0.160211E−04 | −0.153658E−07 | 0.563158E−11 | 0.404797E−12 |
| 21 | 0.9951 | −0.128310E−04 | 0.359226E−08 | −0.902180E−10 | 0.364952E−12 |

TABLE 7

Example 2

| | Wide angle end | Intermediate | Telescopic end |
|---|---|---|---|
| Focal length | 16.480 | 33.000 | 130.950 |
| Half angle of view | 42.212 | 22.971 | 6.117 |
| f-number | 3.600 | 4.366 | 5.813 |
| D5 | 1.578 | 14.170 | 39.258 |
| D13 | 18.799 | 10.039 | 0.800 |
| D18 | 23.243 | 9.584 | 1.100 |
| Bf | 38.000 | 53.520 | 85.559 |

"Table 8" shows values to be checked to see if they fall within the acceptable ranges defined by the conditional expressions described above for Numerical Example 2. As seen from "Table 8," the values in Numerical Example 2 fall within the acceptable ranges defined by the conditional expressions.

TABLE 8

| Conditional expressions | Example 2 |
|---|---|
| f1 | 77.249 |
| f2 | −12.210 |
| f3 | 59.627 |
| f4 | 41.981 |
| f3a | −88.475 |
| (1) f3/f3a | 0.674 |
| (2) f4/f3 | 0.704 |
| (3) (R33 − R32)/(R33 + R32) | 0.055 |
| (4) Da/R44 | 2.122 |
| (5) R41/fw | 1.405 |
| (6) fw/R23 | −0.485 |

Numerical Example 3

"Table 9" to "Table 11" show specific lens data corresponding to the variable focal length lens system 3 according to the third exemplary configuration shown in FIG. 3. In particular, "Table 9" shows basic lens data on the variable focal length lens system 3, and "Table 10" shows data on aspheric surfaces thereof. "Table 11" shows other data. Since the variable focal length lens system 3 is so configured that the lens groups are moved when the magnification is changed, the inter-surface distances in front of and behind the lens groups are variable. "Table 11" shows data on the variable inter-surface distances.

In the variable focal length lens system 3, the first lens group G1 includes a doublet L11 formed of a negative meniscus lens having a surface convex toward the object side and a positive lens having a surface convex toward the object side and a positive meniscus lens L12 having a surface convex toward the object side. The second lens group G2 includes a meniscus-shaped first negative lens L21 having a surface convex toward the object side, a second negative lens L22 having concave surfaces on both sides, a positive lens L23 having convex surfaces on both sides, and a meniscus-shaped third negative lens L24 having a surface concave toward the object side. The third lens group G3 includes a negative meniscus lens L31 having a surface convex toward the object side and a positive lens L32 having convex surfaces on both sides. The fourth lens group G4 includes a first positive lens L41 having a surface convex toward the object side, a negative lens L42 having a surface concave toward the image side, and a second positive lens L43 having convex surfaces on both sides. The aperture stop S is disposed between the second lens group G2 and the third lens group G3 and moves integrally with the third lens group G3 when the lens position setting is changed. The sixth surface and the twenty-first surface are aspheric surfaces.

TABLE 9

| | | Example 3 | | | |
|---|---|---|---|---|---|
| Lens group | Surface number | Radius of curvature | Intersurface distance | Refractive index | Abbe number |
| G1 | 1 | 130.9039 | 1.30 | 1.84666 | 23.83 |
| | 2 | 61.8419 | 5.08 | 1.61800 | 63.40 |
| | 3 | −360.8293 | 0.10 | | |
| | 4 | 40.1291 | 2.50 | 1.69680 | 55.34 |
| | 5 | 72.6500 | (D5) | | |
| G2 | *6 | 56.6175 | 1.15 | 1.81600 | 46.62 |
| | 7 | 12.2891 | 5.32 | | |
| | 8 | −40.3068 | 0.75 | 1.83481 | 42.71 |
| | 9 | 37.5290 | 0.10 | | |
| | 10 | 24.5519 | 3.24 | 1.80810 | 22.76 |
| | 11 | −38.6443 | 1.75 | | |
| | 12 | −17.5653 | 0.75 | 1.83481 | 42.71 |
| | 13 | −45.2941 | (D13) | | |
| | 14(STO) | 0.0000 | 1.60 | | |
| G3 | 15 | 33.3368 | 0.80 | 1.90270 | 31.01 |
| | 16 | 25.7682 | 0.44 | | |
| | 17 | 33.8219 | 2.26 | 1.55332 | 71.69 |
| | 18 | −102.3061 | (D18) | | |
| G4 | 19 | 24.6117 | 3.64 | 1.55332 | 71.69 |
| | 20 | −684.7506 | 6.10 | | |
| | *21 | 187.6848 | 3.00 | 1.91082 | 35.25 |
| | 22 | 25.0000 | 0.56 | | |
| | 23 | 29.7226 | 10.00 | 1.49700 | 81.54 |
| | 24 | −27.7912 | (Bf) | | |

(*Aspheric surface)

TABLE 10

| | | Example 3/Aspheric surface data | | | |
|---|---|---|---|---|---|
| Surface number | k | A | B | C | D |
| 6 | −0.9853 | 0.114159E−04 | 0.134551E−07 | −0.185600E−09 | 0.112516E−11 |
| 21 | 1.0000 | −0.139761E−04 | 0.992186E−08 | −0.652867E−10 | 0.289105E−12 |

TABLE 11

| | Example 3 | | |
|---|---|---|---|
| | Wide angle end | Intermediate | Telescopic end |
| Focal length | 18.540 | 33.000 | 130.950 |
| Half angle of view | 38.877 | 23.103 | 6.124 |
| f-number | 3.596 | 4.367 | 5.815 |
| D5 | 1.732 | 13.061 | 39.962 |
| D13 | 19.042 | 11.421 | 0.800 |
| D18 | 16.519 | 8.114 | 1.200 |
| Bf | 41.271 | 53.651 | 82.240 |

"Table 12" shows values to be checked to see if they fall within the acceptable ranges defined by the conditional expressions described above for Numerical Example 3. As seen from "Table 12," the values in Numerical Example 3 fall within the acceptable ranges defined by the conditional expressions.

TABLE 12

| Conditional expressions | Example 3 |
| --- | --- |
| f1 | 80.333 |
| f2 | −13.168 |
| f3 | 64.523 |
| f4 | 41.109 |
| f3a | −132.371 |
| (1) f3/f3a | 0.487 |
| (2) f4/f3 | 0.637 |
| (3) (R33 − R32)/(R33 + R32) | 0.135 |
| (4) Da/R44 | 1.374 |
| (5) R41/fw | 1.327 |
| (6) fw/R23 | −0.460 |

Aberration Correction

FIGS. 7A to 7D to FIGS. 15A to 15D show aberration correction in Numerical Examples. The aberrations shown in FIGS. 7A to 7D to FIGS. 15A to 15D are calculated when an object at infinity is brought into focus.

FIGS. 7A to 7D show spherical aberration, astigmatism, distortion, and lateral aberrations in the wide-angle end state produced by the variable focal length lens system 1 corresponding to Numerical Example 1. FIGS. 8A to 8D show the same aberrations in an intermediate focal length state. FIGS. 9A to 9D show the same aberrations in the telescopic end state. The aberrations shown in the aberration diagrams are calculated at the d line (587.6 nm) as a reference wavelength. In the astigmatism diagrams, the solid lines represent astigmatism in the sagittal direction, and the broken lines represent astigmatism in the meridional direction. In the lateral aberration diagrams, A denotes the angle of view, and y denotes the image height.

Similarly, FIGS. 10A to 10D to FIGS. 12A to 12D show spherical aberration, astigmatism, distortion, and lateral aberrations produced by the variable focal length lens system 2 corresponding to Numerical Example 2. Similarly, FIGS. 13A to 13D to FIGS. 15A to 15D show spherical aberration, astigmatism, distortion, and lateral aberrations produced by the variable focal length lens system 3 corresponding to Numerical Example 3.

The aberration diagrams described above show that the aberration are corrected in a satisfactory manner and excellent image forming performance is achieved in each of the different magnification areas from the wide-angle end to the telescopic end in each of Examples.

Further, the variable focal length lens system achieved in each of Examples is suitable for a lens having a angle of view ranging from about 70° to 80° in the wide angle end state, a zoom ratio ranging from about 6 to 9, and an F-number ranging from about F2.8 to F4 in the wide angle end state.

Other Embodiments

The technology according to the present disclosure is not necessarily implemented in the embodiment and the examples described above but can be implemented in a variety of variations.

For example, the shapes and numerical values of the components shown in Numerical Examples described above are presented only by way of example for implementing the present disclosure and should not limit the technical scope of the present disclosure.

Further, the above embodiment and the examples have been described with reference to the case where each of the variable focal length lens systems is formed of four lens groups but each of the variable focal length lens systems may further include a lens having practically no power.

Further, the technology according to the present technology may be implemented, for example, as the following configurations.

[1] A variable focal length lens system including a first lens group having positive power, a second lens group having negative power, a third lens group having positive power, and a fourth lens group having positive power sequentially arranged from a side where an object is present, wherein an aperture stop is disposed between the second lens group and the third lens group, the first to fourth lens groups are so moved that the distance between the first lens group and the second lens group increases, the distance between the second lens group and the third lens group decreases, and the distance between the third lens group and the fourth lens group decreases when a lens position setting is changed from a wide angle end state to a telescopic end state, the third lens group includes a negative lens and a positive lens disposed on the image side thereof, and the variable focal length lens system satisfies the following conditional expression:

$$0.35 < f3/|f3a| < 0.8 \quad (1)$$

where f3a represents the focal length of the negative lens disposed in the third lens group, and f3 represents the focal length of the third lens group.

[2] The variable focal length lens system described in [1], the variable focal length lens system satisfies the following conditional expression:

$$0.5 < f4/f3 < 0.8 \quad (2)$$

where f4 represents the focal length of the fourth lens group.

[3] The variable focal length lens system described in [1] or [2], wherein in the third lens group, the negative lens has a surface concave toward a side where an image is formed and the positive lens has an object-side lens surface convex toward the object side, and the variable focal length lens system satisfies the following conditional expression:

$$0.03 < (R33-R32)/(R33+R32) < 0.18 \quad (3)$$

where R33 represents the radius of curvature of the object-side lens surface of the positive lens disposed in the third lens group, and R32 represents the radius of curvature of the image-side lens surface of the negative lens disposed in the third lens group.

[4] The variable focal length lens system described in any one of [1] to [3], wherein the fourth lens group includes the following three lenses: a first positive lens having a surface convex toward the object side; a negative lens having a surface concave toward the image side; and a second positive lens having convex surfaces on both sides sequentially arranged from the object side, and the variable focal length lens system satisfies the following conditional expression:

$$1 < Da/R44 < 2.8 \quad (4)$$

where Da represents the length along an optical axis from the aperture stop to the image-side lens surface of the negative lens disposed in the fourth lens group in the wide angle end state, and R44 represents the radius of curvature of the image-side lens surface of the negative lens disposed in the fourth lens group.

[5] The variable focal length lens system described in [4], wherein the variable focal length lens system satisfies the following conditional expression:

$$0.9 < R41/fw < 1.8 \quad (5)$$

where R41 represents the radius of curvature of the object-side lens surface of the first positive lens disposed in the fourth lens group, and fw represents the focal length of the entire lens system in the wide angle end state.

[6] The variable focal length lens system described in any one of [1] to [5], wherein the second lens group includes the following four lenses: a first negative lens having a surface concave toward the image side; a second negative lens having a surface concave toward the object side; a positive lens having convex surfaces on both sides, and a third negative lens having a surface concave toward the object side sequentially arranged from the object side, and the variable focal length lens system satisfies the following conditional expression:

$$-0.65 < fw/R23 < -0.35 \quad (6)$$

where R23 represents the radius of curvature of the object-side lens surface of the second negative lens disposed in the second lens group.

[7] The variable focal length lens system described in any one of [1] to [6], further including a lens having practically no power.

[8] An imaging apparatus including a variable focal length lens system and an imaging device that outputs a captured signal according to an optical image formed by the variable focal length lens system, wherein the variable focal length lens system includes a first lens group having positive power, a second lens group having negative power, a third lens group having positive power, and a fourth lens group having positive power sequentially arranged from a side where an object is present, an aperture stop is disposed between the second lens group and the third lens group, the first to fourth lens groups are so moved that the distance between the first lens group and the second lens group increases, the distance between the second lens group and the third lens group decreases, and the distance between the third lens group and the fourth lens group decreases when a lens position setting is changed from a wide angle end state to a telescopic end state, the third lens group includes a negative lens and a positive lens disposed on the image side thereof, and the variable focal length lens system satisfies the following conditional expression:

$$0.35 < f3/|f3a| < 0.8 \quad (1)$$

where f3a represents the focal length of the negative lens disposed in the third lens group, and f3 represents the focal length of the third lens group.

[9] The imaging apparatus described in [8], wherein the variable focal length lens system further includes a lens having practically no power.

The present disclosure contains subject matter related to that disclosed in Japanese Priority Patent Application JP 2011-191470 filed in the Japan Patent Office on Sep. 2, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable focal length lens system comprising:
a first lens group having positive power;
a second lens group having negative power;
a third lens group having positive power; and
a fourth lens group having positive power sequentially arranged from a side where an object is present,
wherein an aperture stop is disposed between the second lens group and the third lens group and moves integrally with the third lens group,
the first lens group, the second lens group, the aperture stop, the third lens group and the fourth lens group are arranged in this order along an optical axis from an object side to an image side defining an image plane extending perpendicularly to the optical axis,
the variable focal length lens system moves to and between a wide angle end state and a telescopic state,
relative to the wide angle end state, in the telescopic end state, each one of the first lens group, the second lens group, the aperture stop, the third lens group and the fourth lens group is disposed away from the image plane while the first lens group and the second lens group are disposed further apart from one another, the second lens group and the third lens group are disposed closer to each other and the third lens group and the fourth lens group are disposed closer to each other,
the third lens group includes a negative lens and a positive lens disposed on an image side thereof, and
the variable focal length lens system satisfies the following conditional expression (1):

$$0.35 < f3/|f3a| < 0.8 \quad (1)$$

where f3a represents a focal length of the negative lens disposed in the third lens group, and f3 represents a focal length of the third lens group.

2. The variable focal length lens system according to claim 1,
the variable focal length lens system satisfies the following conditional expression (2):

$$0.5 < f4/f3 < 0.8 \quad (2)$$

where f4 represents a focal length of the fourth lens group.

3. The variable focal length lens system according to claim 1,
wherein in the third lens group, the negative lens has a surface concave toward a side where an image is formed and the positive lens has an object-side lens surface convex toward the object side, and
the variable focal length lens system satisfies the following conditional expression (3):

$$0.03 < (R33-R32)/(R33+R32) < 0.18 \quad (3)$$

where R33 represents a radius of curvature of an object-side lens surface of the positive lens disposed in the third lens group, and R32 represents a radius of curvature of an image-side lens surface of the negative lens disposed in the third lens group.

4. The variable focal length lens system according to claim 1,
wherein the fourth lens group includes:
a first positive lens having a surface convex toward the object side;
a negative lens having a surface concave toward the image side; and
a second positive lens having convex surfaces on both sides sequentially arranged from the object side, and the variable focal length lens system satisfies the following conditional expression (4):

$$1 < Da/R44 < 2.8 \tag{4}$$

where Da represents a length along an optical axis from the aperture stop to an image-side lens surface of the negative lens disposed in the fourth lens group in the wide angle end state, and R44 represents a radius of curvature of the image-side lens surface of the negative lens disposed in the fourth lens group.

5. The variable focal length lens system according to claim 4, wherein the variable focal length lens system satisfies the following conditional expression (5):

$$0.9 < R41/fw < 1.8 \tag{5}$$

where R41 represents a radius of curvature of an object-side lens surface of the first positive lens disposed in the fourth lens group, and fw represents a focal length of the variable focal length lens system in the wide angle end state.

6. The variable focal length lens system according to claim 1, wherein the second lens group includes:
a first negative lens having a surface concave toward the image side;
a second negative lens having a surface concave toward the object side;
a positive lens having convex surfaces on both sides; and
a third negative lens having a surface concave toward the object side sequentially arranged from the object side, and
the variable focal length lens system satisfies the following conditional expression (6):

$$-0.65 < fw/R23 < -0.35 \tag{6}$$

where R23 represents a radius of curvature of an object-side lens surface of the second negative lens disposed in the second lens group.

7. An imaging apparatus comprising:
a variable focal length lens system; and
an imaging device that outputs a captured signal according to an optical image formed by the variable focal length lens system,
wherein the variable focal length lens system includes a first lens group having positive power, a second lens group having negative power, a third lens group having positive power, and a fourth lens group having positive power sequentially arranged from a side where an object is present,
an aperture stop is disposed between the second lens group and the third lens group and moves integrally with the third lens group,
the first lens group, the second lens group, the aperture stop, the third lens group and the fourth lens group are arranged in this order along an optical axis from an object side to an image side defining an image plane extending perpendicularly to the optical axis,
the variable focal length lens system moves to and between a wide angle end state and a telescopic state,
relative to the wide angle end state, in the telescopic end state, each one of the first lens group, the second lens group, the aperture stop, the third lens group and the fourth lens group is disposed away from the image plane while the first lens group and the second lens group are disposed further apart from one another, the second lens group and the third lens group are disposed closer to each other and the third lens group and the fourth lens group are disposed closer to each other,
the third lens group includes a negative lens and a positive lens disposed on an image side thereof, and
the variable focal length lens system satisfies the following conditional expression (1):

$$0.35 < f3/|f3a| < 0.8 \tag{1}$$

where f3a represents a focal length of the negative lens disposed in the third lens group, and f3 represents the focal length of the third lens group.

8. The imaging apparatus according to claim 7, wherein the variable focal length lens system satisfies the following conditional expression (2):

$$0.5 < f4/f3 < 0.8 \tag{2}$$

where f4 represents a focal length of the fourth lens group.

9. The imaging apparatus according to claim 7, wherein in the third lens group, the negative lens has a surface concave toward a side where an image is formed and the positive lens has an object-side lens surface convex toward the object side, and
the variable focal length lens system satisfies the following conditional expression (3):

$$0.03 < (R33-R32)/(R33+R32) < 0.18 \tag{3}$$

where R33 represents a radius of curvature of an object-side lens surface of the positive lens disposed in the third lens group, and R32 represents a radius of curvature of an image-side lens surface of the negative lens disposed in the third lens group.

10. The imaging apparatus according to claim 7, wherein the fourth lens group includes:
a first positive lens having a surface convex toward the object side;
a negative lens having a surface concave toward the image side; and
a second positive lens having convex surfaces on both sides sequentially arranged from the object side, and
the variable focal length lens system satisfies the following conditional expression (4):

$$1 < Da/R44 < 2.8 \tag{4}$$

where Da represents a length along an optical axis from the aperture stop to an image-side lens surface of the negative lens disposed in the fourth lens group in the wide angle end state, and R44 represents a radius of curvature of the image-side lens surface of the negative lens disposed in the fourth lens group.

11. The imaging apparatus according to claim 10, wherein the variable focal length lens system satisfies the following conditional expression $$0.9 < R41/fw < 1.8 \tag{5}$$

where R41 represents a radius of curvature of an object-side lens surface of the first positive lens disposed in the fourth lens group, and fw represents a focal length of the variable focal length lens system in the wide angle end state.

12. The imaging apparatus according to claim 7, wherein the second lens group includes:
a first negative lens having a surface concave toward the image side;
a second negative lens having a surface concave toward the object side;
a positive lens having convex surfaces on both sides; and a third negative lens having a surface concave toward the object side sequentially arranged from the object side, and the variable focal length lens system satisfies the following conditional expression (6):

$$-0.65 < fw/R23 < -0.35 \tag{6}$$

where R23 represents a radius of curvature of an object-side lens surface of the second negative lens disposed in the second lens group.

* * * * *